United States Patent
Nomura

(10) Patent No.: US 12,292,505 B2
(45) Date of Patent: May 6, 2025

(54) TARGET OBJECT DETECTION APPARATUS, TARGET OBJECT DETECTION METHOD, AND NON-TRANSITORY COMPUTER-READABLE STORAGE MEDIUM

(71) Applicant: NEC Corporation, Tokyo (JP)

(72) Inventor: Toshiyuki Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 427 days.

(21) Appl. No.: 17/777,337

(22) PCT Filed: Nov. 19, 2019

(86) PCT No.: PCT/JP2019/045243
§ 371 (c)(1),
(2) Date: May 17, 2022

(87) PCT Pub. No.: WO2021/100115
PCT Pub. Date: May 27, 2021

(65) Prior Publication Data
US 2023/0003884 A1 Jan. 5, 2023

(51) Int. Cl.
*G06K 9/00* (2022.01)
*G01S 17/42* (2006.01)
(Continued)

(52) U.S. Cl.
CPC ............ *G01S 17/42* (2013.01); *G06T 7/70* (2017.01); *G06V 10/25* (2022.01); *G06V 2201/07* (2022.01)

(58) Field of Classification Search
CPC ........ G01S 17/42; G01S 13/887; G01S 13/89; G06T 7/70; G06T 2207/10016;
(Continued)

(56) References Cited

U.S. PATENT DOCUMENTS 6,965,340 B1 * 11/2005 Baharav ............... H01Q 21/065
342/195
9,996,890 B1 * 6/2018 Cinnamon ........... G06V 10/764
(Continued)

FOREIGN PATENT DOCUMENTS

| JP | 2003-177175 A | 6/2003 |
| JP | 2005-024378 A | 1/2005 |

(Continued)

OTHER PUBLICATIONS

International Search Report for PCT Application No. PCT/JP2019/045243, mailed on Feb. 10, 2020.

*Primary Examiner* — Xin Jia

(57) ABSTRACT

A target object detection apparatus (20) includes an image generation unit (220) that generates, from three-dimensional information acquired by processing a reflection wave of an electromagnetic wave irradiated toward an inspection target, a two-dimensional image of the inspection target viewed from a predetermined direction; an area detection unit (230) that detects, from the two-dimensional image, each of at least two detection areas of detection target objects recognized by using at least two recognition means; and an identification unit (240) that identifies the detection target object, based on a positional relationship between the detected at least two detection areas.

30 Claims, 21 Drawing Sheets

(51) Int. Cl.
*G06T 7/70* (2017.01)
*G06V 10/25* (2022.01)

(58) Field of Classification Search
CPC ............. G06T 2207/30196; G06T 7/73; G06T 2207/30232; G06V 10/25; G06V 2201/07; G06F 2218/08
See application file for complete search history.

(56) References Cited

U.S. PATENT DOCUMENTS

| | | | |
|---|---|---|---|
| 2006/0262902 A1* | 11/2006 | Wattenburg | G01N 23/04 378/57 |
| 2009/0041293 A1 | 2/2009 | Andrew et al. | |
| 2016/0216371 A1 | 7/2016 | Ahmed et al. | |
| 2019/0012798 A1 | 1/2019 | Amano et al. | |
| 2019/0196004 A1* | 6/2019 | Zhao | G01S 13/887 |

FOREIGN PATENT DOCUMENTS

| | | |
|---|---|---|
| JP | 2005-351811 A | 12/2005 |
| JP | 2010-197378 A | 9/2010 |
| WO | 2017/158958 A1 | 9/2017 |

\* cited by examiner

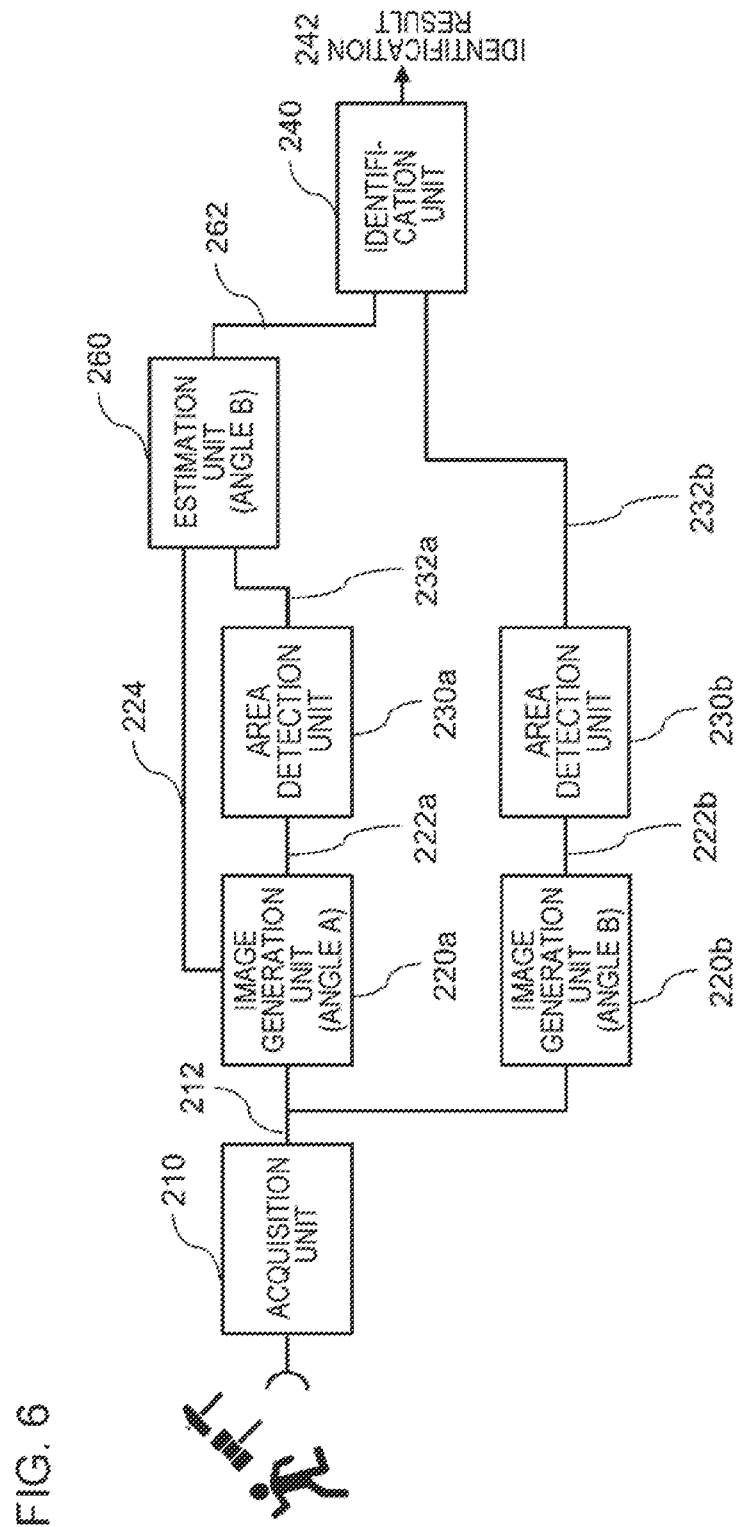

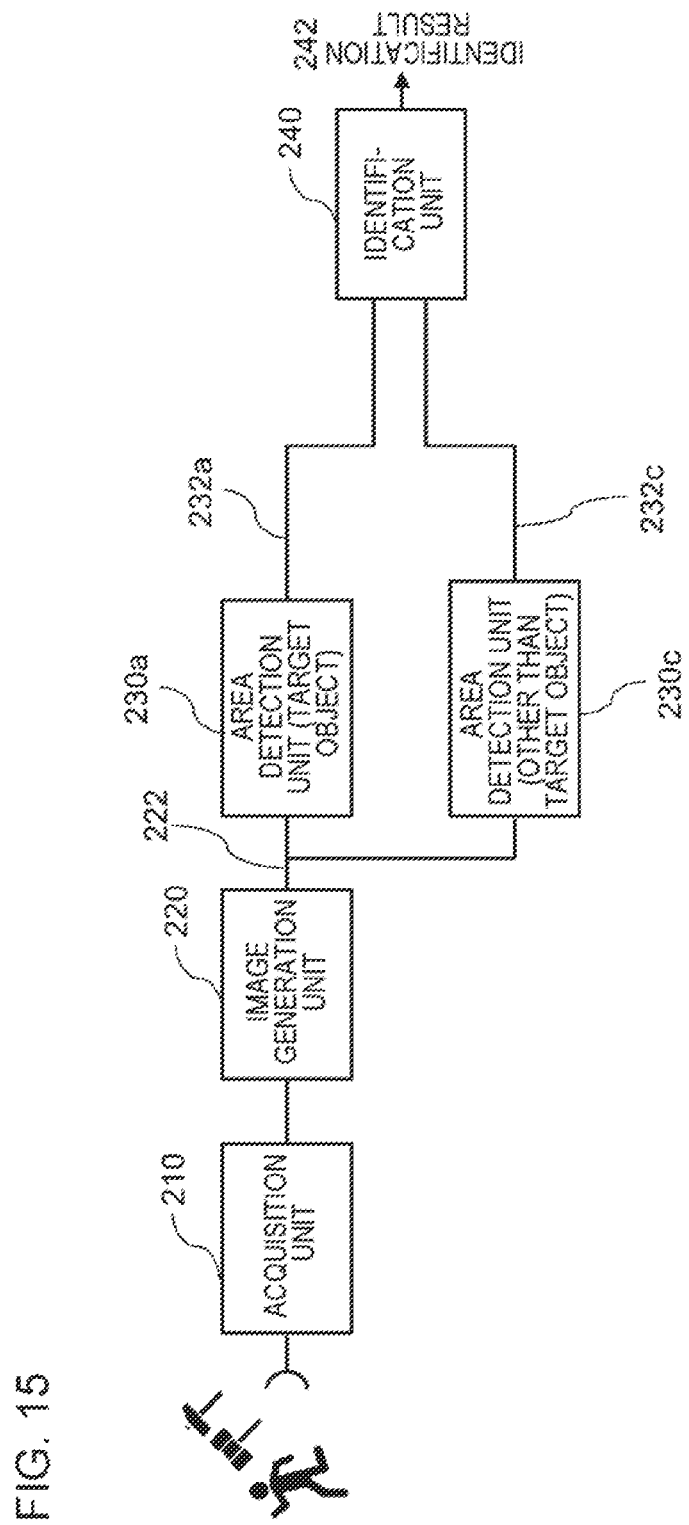

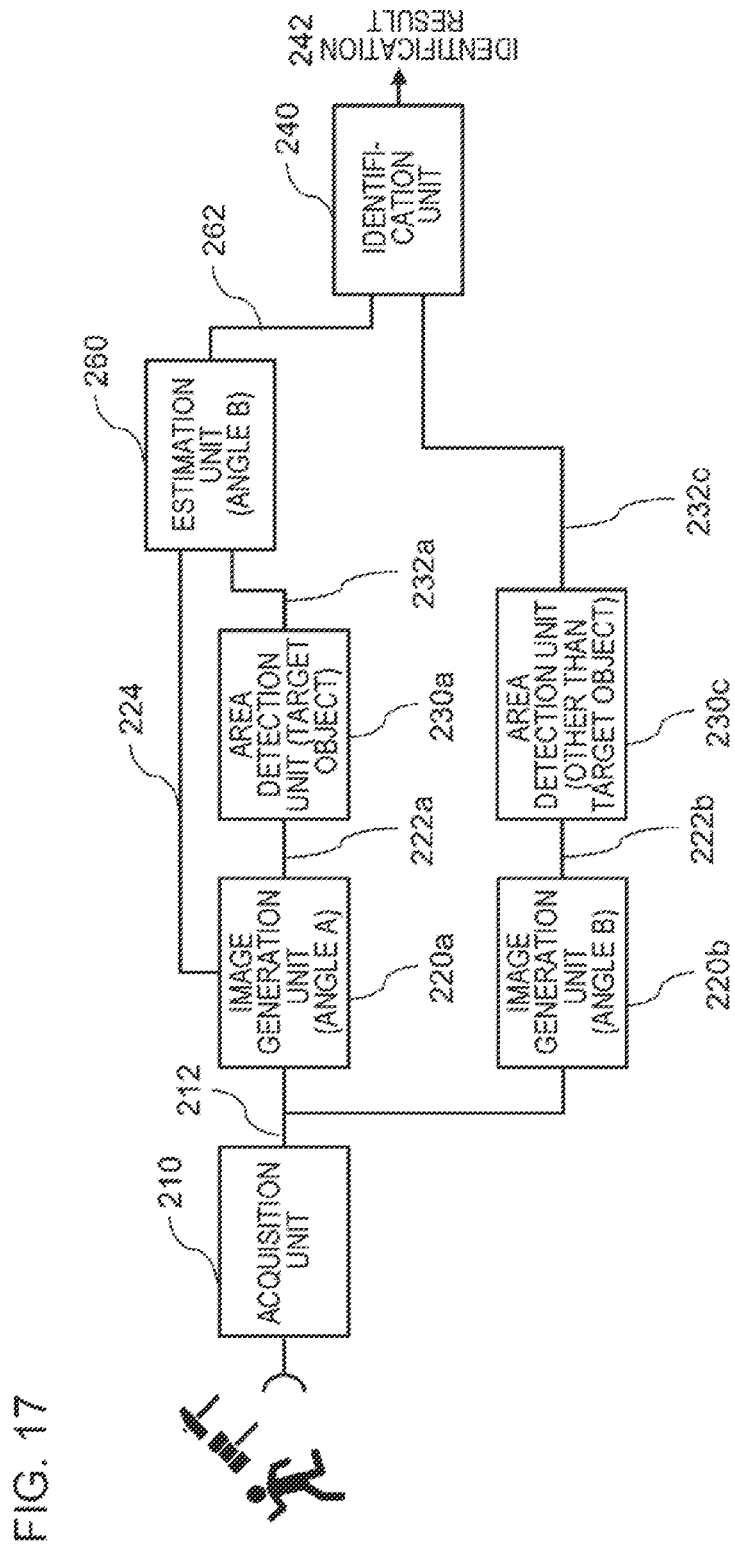

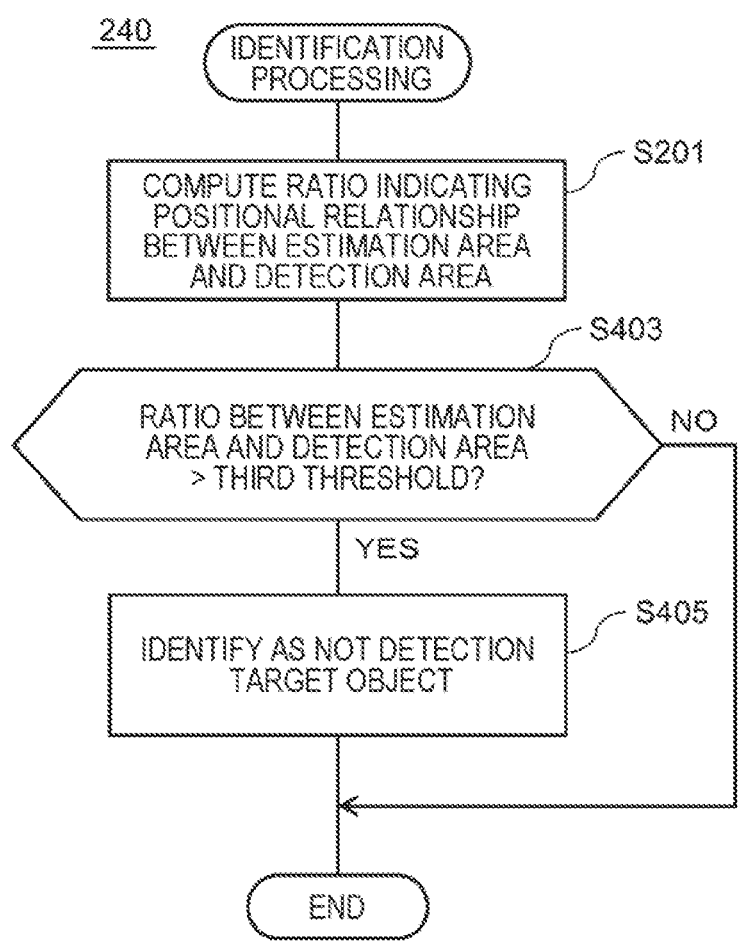

TARGET OBJECT DETECTION APPARATUS, TARGET OBJECT DETECTION METHOD, AND NON-TRANSITORY COMPUTER-READABLE STORAGE MEDIUM

This application is a National Stage Entry of PCT/JP2019/045243 filed on Nov. 19, 2019, the contents of all of which are incorporated herein by reference, in their entirety.

TECHNICAL FIELD

The present invention relates to a target object detection apparatus, a target object detection method, and a program.

BACKGROUND ART

In a facility such as an airport, carrying-in of a specific article may be restricted. In such a facility, in many cases, person's belongings are inspected in an entrance gate to the facility, or on a passageway to the facility. As techniques relating to the inspection, there are apparatuses described in Patent Documents 1 and 2. Patent Document 1 describes that an image is generated by receiving a millimeter-wave radiated from a person. Patent Document 2 also describes that an image is generated by irradiating a microwave on a person from three directions, and analyzing a reflection wave of the microwave.

RELATED DOCUMENTS

Patent Documents

[Patent Document 1] Japanese Patent Application Publication No. 2003-177175
[Patent Document 2] United States Patent Application Publication No. 2016/0216371

SUMMARY OF THE INVENTION

Technical Problem

When a reflection wave of an electromagnetic wave irradiated on an inspection target is analyzed, a three-dimensional shape of the inspection target, such as a person, and an accompanying object of the inspection target (for example, person's belongings) can be estimated. When three-dimensional information of the reflection wave of the electromagnetic wave is converted into a two-dimensional image in order to reduce a load of processing, there is a case where, even when a controlled article is to be detected as a detection target object by image recognition processing, the controlled article cannot be detected or is erroneously detected. Thus, there is a possibility that detection accuracy of the target object lowers.

An object of the present invention is to improve detection accuracy and detection efficiency when detecting a target object by irradiating an electromagnetic wave on the target object and analyzing a reflection wave of the electromagnetic wave.

Solution to Problem

In aspects of the present invention, in order to solve the above problem, the following configurations are adopted.

A first aspect relates to a target object detection apparatus.

The target object detection apparatus according to the first aspect includes:
an image generation unit that generates, from three-dimensional information acquired by processing a reflection wave of an electromagnetic wave irradiated toward an inspection target, a two-dimensional image of the inspection target viewed from a predetermined direction;
an area detection unit that detects, from the two-dimensional image, each of at least two detection areas of a detection target object recognized by using at least two recognition means; and
an identification unit that identifies the detection target object, based on a positional relationship between the detected at least two detection areas.

A second aspect relates to a target object detection method executed by at least one computer.

The target object detection method according to the second aspect includes:
by a target object detection apparatus,
generating, from three-dimensional information acquired by processing a reflection wave of an electromagnetic wave irradiated toward an inspection target, a two-dimensional image of the inspection target viewed from a predetermined direction;
detecting, from the two-dimensional image, each of at least two detection areas of a detection target object recognized by using at least two recognition means; and
identifying the detection target object, based on a positional relationship between the detected at least two detection areas.

Note that, another aspect of the present invention may be a program that causes at least one computer to execute the method of the above second aspect, or may be a computer-readable storage medium that stores the program. The storage medium includes a non-transitory tangible medium.

The computer program includes a computer program code that causes a computer to implement the target object detection method on the target object detection apparatus, when the computer program is executed by the computer.

Note that, any combination of the above-described structural elements, and expression of the present invention, which are converted among a method, an apparatus, a system, a storage medium, a computer program and the like, are also valid as a mode of the present invention.

Additionally, it is not always necessary that the various structural elements of the present invention are mutually independent entities, and a plurality of structural elements may be formed as one member, one structural element may be formed of a plurality of members, a certain structural element may be a part of another structural element, a part of a certain structural element and a part of another structural element may overlap, or the like.

Additionally, in the method and the computer program of the present invention, a plurality of procedures are sequentially described, but the described order does not restrict an order of execution of procedures. Thus, when the method and the computer program of the present invention are implemented, the order of the plurality of procedures can be changed as long as no problem arises in a content of the procedures.

Furthermore, the plurality of procedures of the method and the computer program of the present invention may not be restricted to execute at mutually different timings. Thus, while a certain procedure is being executed, another procedure may occur, an execution timing of a certain procedure may partly or entirely overlap an execution timing of another procedure, or the like.

Advantageous Effects of Invention

According to the present invention, detection accuracy and detection efficiency is improved when detecting a target object by irradiating an electromagnetic wave on the target object and analyzing a reflection wave of the electromagnetic wave.

BRIEF DESCRIPTION OF THE DRAWINGS

The above-described object, other objects, features and advantageous effects will become clearer by preferred example embodiments to be described below, and the following accompanying drawings.

FIG. 6 is a functional block diagram illustrating a configuration example of the target object detection apparatus of the present example embodiment.

FIG. 15 is a functional block diagram illustrating a configuration example of the target object detection apparatus of the present example embodiment.

FIG. 17 is a functional block diagram illustrating a configuration example of a target object detection apparatus of a modification of a fifth example embodiment.

FIG. 18 is a flowchart illustrating procedures for identification processing of an identification unit.

DESCRIPTION OF EMBODIMENTS

Hereinafter, example embodiments of the present invention will be described with reference to the accompanying drawings. Note that, in all drawings, a similar structural element is denoted by a similar reference sign, and a description is omitted unless where necessary.

In the example embodiments, "acquisition" includes at least one of acquisition (active acquisition) in which an own apparatus fetches data or information stored in another apparatus or a storage medium, and input (passive acquisition) in which an own apparatus inputs data or information being output from another apparatus. Examples of the active acquisition include issuing a request or an inquiry to another apparatus and receiving a response thereto, accessing another apparatus or a storage medium and reading, and the like. In addition, examples of the passive acquisition include reception of information being delivered (or transmitted, push-notified, or the like), and the like. Further, the "acquisition" may be acquisition by selection from received data or information, or may be selective reception of delivered data or information.

First Example Embodiment

Figure 1:
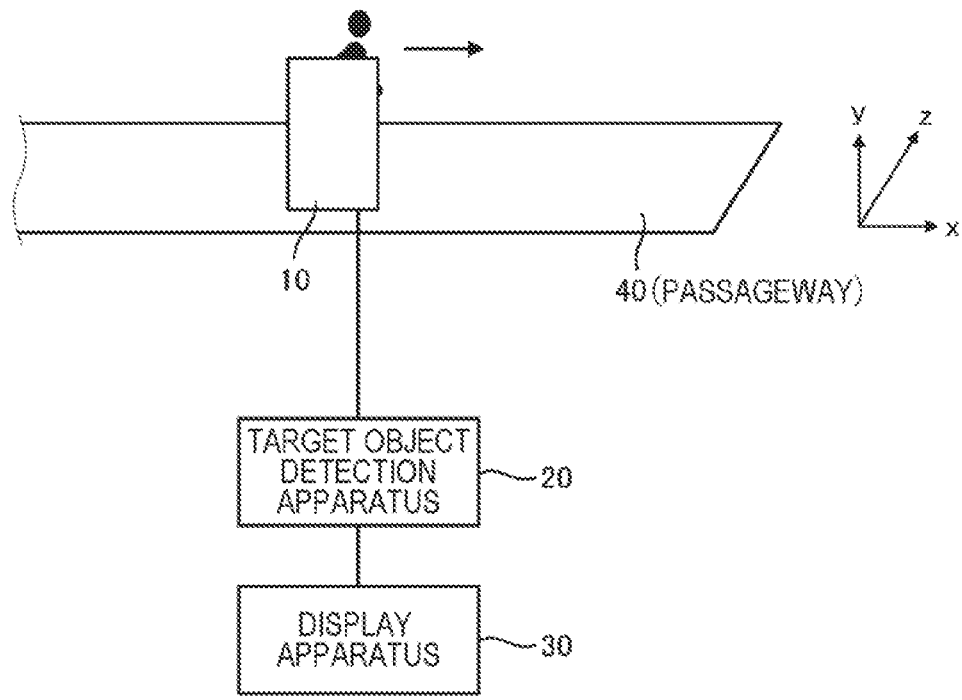
FIG. 1 is a diagram describing a usage environment of a target object detection apparatus according to an example embodiment.

FIG. 1 is a diagram describing a usage environment of a target object detection apparatus according to an example embodiment. The target object detection apparatus 20 is used together with an irradiation apparatus 10 and a display apparatus 30.

The irradiation apparatus 10 irradiates an electromagnetic wave on an inspection target such as a passerby, and receives a reflection wave of the electromagnetic wave, which is reflected by the inspection target. Further, the irradiation apparatus 10 generates an intermediate-frequency signal (IF signal) by frequency-converting the received reflection wave into an intermediate-frequency band.

As an electromagnetic wave irradiated by the irradiation apparatus 10, it is preferable to use an electromagnetic wave having a wavelength being transmitted through cloth (for example, clothing) but reflected by an inspection target itself (for example, a human body) or an accompanying object of the inspection target. In one example, an electromagnetic wave is a microwave, a millimeter-wave, or a terahertz-wave, and have a wavelength of equal to or more than 30 micrometers and equal to or less than one meter. Note that, in FIG. 1, a horizontal direction of a plane of irradiation of an electromagnetic wave by the irradiation apparatus 10 is an x direction, a vertical direction (up-and-down direction) of the plane is a y direction, and a direction of irradiation of an electromagnetic wave is a z direction. In other words, from a viewpoint of the inspection target, a direction of movement of the inspection target is approximately the x direction, an up-and-down direction is the y direction, and a direction substantially perpendicular to the direction of movement of the inspection target is the z direction. The irradiation apparatus 10 executes, at a plurality of timings, processing of generating the above-described IF signal. The irradiation apparatus 10 executes the processing of generating the above-described IF signal, for example, ten or more times (preferably 20 or more times) per second.

In an example illustrated in FIG. 1, the irradiation apparatus 10 is disposed in parallel (180 degrees) to a passageway 40 of an inspection target, but the irradiation apparatus 10 may be disposed to have an angle other than 180 degrees to the passageway 40.

The target object detection apparatus 20 acquires an IF signal from the irradiation apparatus 10, processes the IF signal, and thereby generates three-dimensional position information indicating a three-dimensional shape of at least a part of an inspection target. The three-dimensional position information includes information for determining each of a distance from a part (reflection point) of an inspection target, on which an electromagnetic wave is irradiated, to the irradiation apparatus 10, and an angle of the reflection point at a time when the irradiation apparatus 10 (for example, an antenna (not illustrated) that a reception unit 130 includes) is set as a reference. The distance determined by the three-dimensional position information may be, for example, a distance from a transmission antenna (not illustrated) that a transmission unit 110 to be described later includes, to a target part, may be a distance from a reception antenna that the reception unit 130 includes to the target tart, or may be an average value of these distances.

Note that, it is preferable that the three-dimensional position information also includes information of intensity of a reflection wave at each position. When an inspection target has an accompanying object (for example, belongings), the three-dimensional position information serves also as information for determining a three-dimensional shape of at least a part of the accompanying object.

The target object detection apparatus 20 determines presence/absence of an accompanying object, and causes the display apparatus 30 to display information indicating a determination result. Note that, a detection target of the target object detection apparatus 20 is not limited to the above-described accompanying object.

In addition, the target object detection apparatus 20 generates, where necessary, a two-dimensional or three-dimensional image of an inspection target, and causes the display apparatus 30 to display the image. When the inspection target has an accompanying object, the image also includes the accompanying object.

Note that, the irradiation apparatus 10 is also provided with a sensor (for example, a human sensor) that detects an inspection target coming into an irradiation target area, and a sensor (for example, a human sensor) that detects an inspection target going out of the irradiation target area. The irradiation apparatus 10 or the target object detection apparatus 20 can determine a plurality of IF signals associated with an identical inspection target by using detection results of these sensors. Detection of an inspection target may be performed by using a received reflection wave, instead of the sensor.

Figure 2:
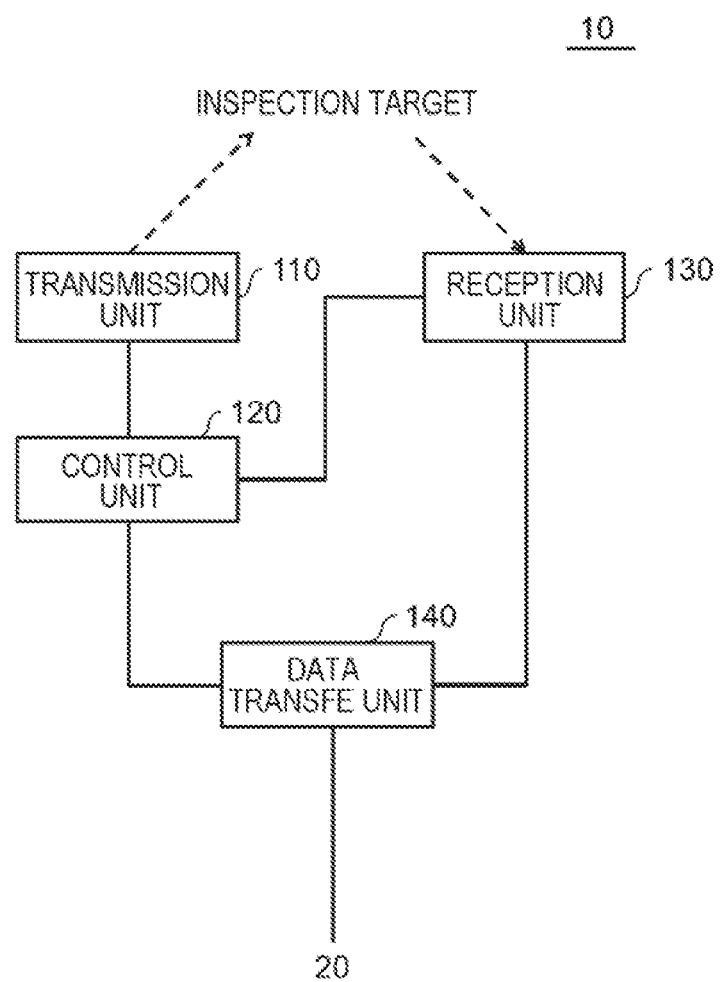
FIG. 2 is a diagram illustrating one example of a functional configuration of an irradiation apparatus.

FIG. 2 is a diagram illustrating one example of a functional configuration of the irradiation apparatus 10. In an example illustrated in the present figure, the irradiation apparatus 10 includes the transmission unit 110, a control unit 120, the reception unit 130, and a data transfer unit 140.

The transmission unit 110 irradiates an electromagnetic wave toward an area (hereinafter, referred to as "irradiation area") through which an inspection target passes. The transmission unit 110 includes, for example, an omnidirectional antenna. The transmission unit 110 can change a frequency of an electromagnetic wave within a fixed range. The transmission unit 110 is controlled by the control unit 120. The control unit 120 also controls the reception unit 130.

The reception unit 130 receives a reflection wave from an inspection target. The reception unit 130 generates an intermediate-frequency signal (IF signal) by frequency-converting a received reflection wave into an intermediate-frequency band. The control unit 120 executes control to set a proper value to the intermediate-frequency band in the reception unit 130.

The data transfer unit 140 acquires the IF signal generated in the reception unit 130, and outputs the acquired IF signal to the target object detection apparatus 20. It is preferable that the data transfer unit 140 also outputs a time at transmission or a time when the IF signal is generated to the target object detection apparatus 20 (hereinafter, also referred to as "time information").

Figure 3:
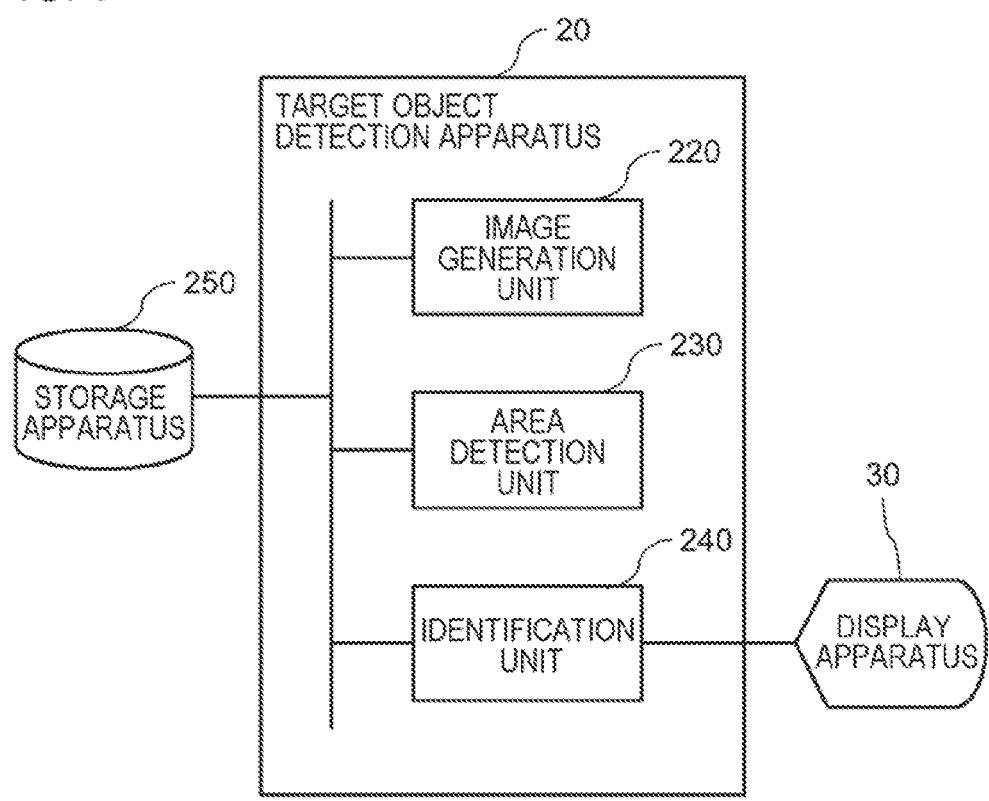
FIG. 3 is a diagram illustrating one example of a functional configuration of the target object detection apparatus.

FIG. 3 is a diagram illustrating one example of a functional configuration of the target object detection apparatus 20. The target object detection apparatus 20 includes an image generation unit 220, an area detection unit 230, and an identification unit 240.

The image generation unit 220 generates, from three-dimensional information acquired by processing a reflection wave of an electromagnetic wave irradiated toward an inspection target, a two-dimensional image of the inspection target viewed from a predetermined direction. The area detection unit 230 detects, from the two-dimensional image, each of at least two detection areas of a detection target object recognized by using at least two recognition means. The identification unit 240 identifies the detection target object, based on a positional relationship between the detected at least two detection areas.

The inspection target is, for example, a person or baggage. The predetermined direction is a certain one direction or two directions. The detection target object includes, for example, a controlled article such as a dangerous weapon or a dangerous article, and object (for example, a body, an arm, and the like) other than the controlled article.

The target object detection apparatus 20 may further include a storage apparatus 250 that stores acquired three-dimensional information, a generated two-dimensional image, an identification result, and the like. The storage apparatus 250 may be the same apparatus as the target object detection apparatus 20, or may be a separate apparatus from the target object detection apparatus 20. Further, the storage apparatus 250 may be a plurality of storage apparatuses.

Although the at least two recognition means will be described in detail in an example embodiment to be described later, the at least two recognition means are exemplified below.

(a1) The at least two recognition means are recognition means for generating two two-dimensional images viewed from different directions, and recognizing the detection target object therefrom, and two detection areas are detected from each of the two-dimensional images by the area detection unit 230.

(a2) The at least two recognition means are recognition means for recognizing two different detection target objects from one two-dimensional image viewed from a predetermined direction, and two detection areas are detected from the one two-dimensional image by the area detection unit 230.

The recognition means of the area detection unit 230 recognizes a detection target object by collating, by image recognition processing, a two-dimensional image of an object, which is registered in advance as the detection target object and viewed from a predetermined direction, and a two-dimensional image generated by the image generation unit 220. In addition, when a method based on machine learning is used as the image recognition processing, a detection target object is recognized by using a model being learned by using, as training data, a two-dimensional image of the detection target object viewed from a predetermined direction.

Although an identification method of a detection target object by the identification unit 240 will be described in an example embodiment to be described later, the identification method is exemplified below.

(b1) A detection target object is recognized from each of two different two-dimensional images, and it is determined as erroneous detection when positions of objects, which are recognized as an identical detection target object, are different from each other.

(b2) A detection target object is recognized from each of two different two-dimensional images, and it is determined as the detection target object when positions of objects, which are recognized as an identical detection target object, are the same.

(b3) Two different detection target objects are recognized from one two-dimensional image, and the detection target object is identified based on whether a positional relationship between the detection target objects is a relationship being registered in advance. For example, in a case where one detection target object is a dangerous weapon and the other detection target object is an arm, the positional relationship between the two detection target objects is registered in advance, and each detection target object is identified when the positional relationship between the two recognized objects agrees with the registered positional relationship.

(b4) Two different detection target objects are recognized from one two-dimensional image, and it is identified as erroneous recognition when positions of two objects recognized as the detection target objects are the same.

Figure 4:
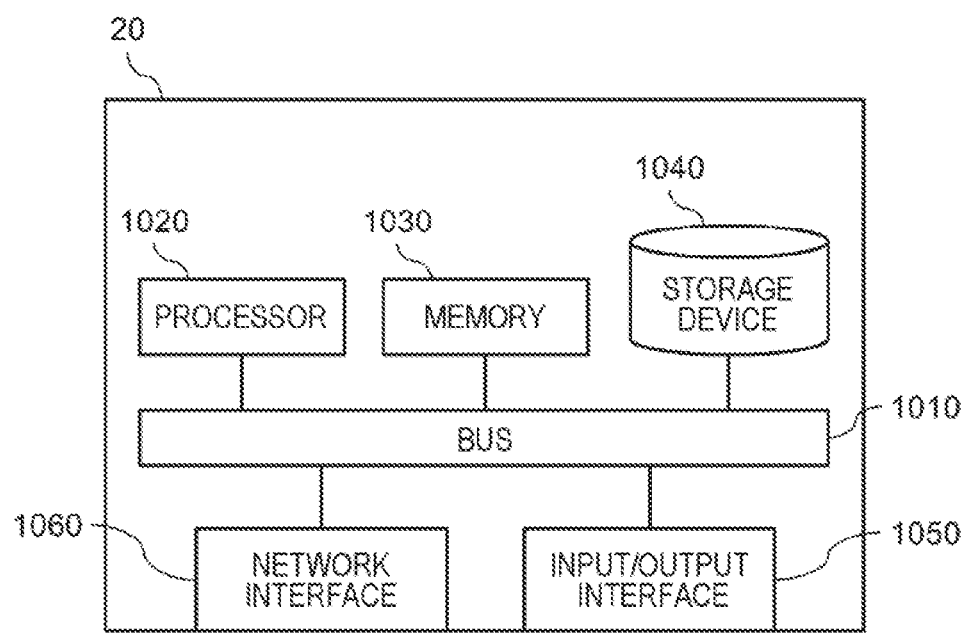
FIG. 4 is a block diagram illustrating a hardware configuration of the target object detection apparatus.

FIG. 4 is a block diagram illustrating a hardware configuration of the target object detection apparatus 20. The target object detection apparatus 20 includes a bus 1010, a processor 1020, a memory 1030, a storage device 1040, an input/output interface 1050, and a network interface 1060.

The bus 1010 is a data transmission path for mutual data transmission/reception among the processor 1020, the memory 1030, the storage device 1040, the input/output interface 1050, and the network interface 1060. However, a method of mutual connection among the processor 1020 and the like is not limited to bus connection.

The processor 1020 is a processor being achieved by a central processing unit (CPU), a graphics processing unit (GPU), or the like.

The memory 1030 is a main storage apparatus being achieved by a random access memory (RAM) or the like.

The storage device 1040 is an auxiliary storage apparatus being achieved by a hard disk drive (HDD), a solid state drive (SSD), a memory card, a read only memory (ROM), or the like.

The storage device 1040 stores a program module achieving each function of the target object detection apparatus 20 (for example, the acquisition unit 210, the image generation unit 220, the area detection unit 230, and the identification unit 240, and an estimation unit 260 and an output control unit 280 to be described later, and the like). The processor 1020 reads each program module in the memory 1030, executes each program module, and thereby achieves each function relating to the program module. The storage device 1040 functions also as various kinds of storage units.

The input/output interface 1050 is an interface for connecting the target object detection apparatus 20 and various kinds of input/output equipment (for example, the display apparatus 30).

The network interface 1060 is an interface for connecting the target object detection apparatus 20 to another apparatus (for example, the irradiation apparatus 10) on a network. However, there is a case where the network interface 1060 is not used.

Figure 5:
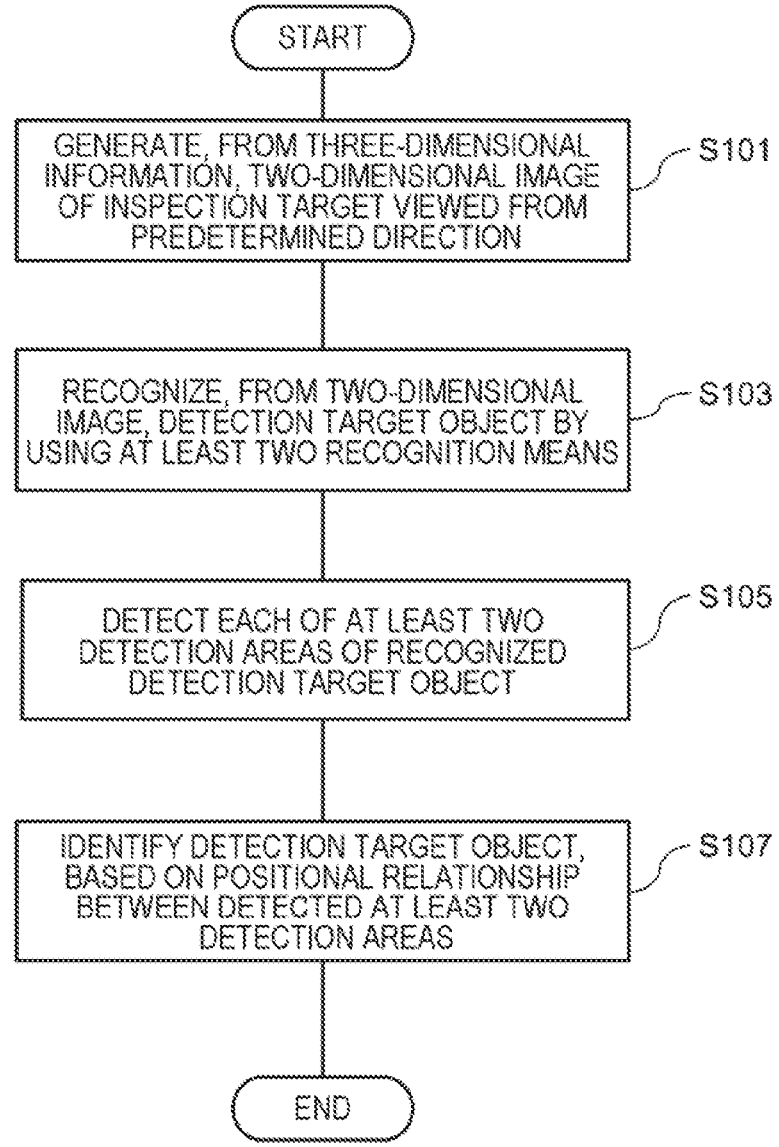
FIG. 5 is a flowchart illustrating one example of an operation of the target object detection apparatus.

FIG. 5 is a flowchart illustrating one example of an operation of the target object detection apparatus 20. First, the image generation unit 220 generates, from three-dimensional information, a two-dimensional image of an inspection target viewed from a predetermined direction (step S101). Then, the area detection unit 230 detects, from the two-dimensional image, a detection target object by using at least two recognition means (step S103). Further, the area detection unit 230 detects each of at least two detection areas of the detected detection target object (step S105). The identification unit 240 identifies the detection target object, based on a positional relationship between the detected at least two detection areas (step S107).

According to the present example embodiment, the area detection unit 230 detects at least two detection areas of a detection target object recognized by using at least two recognition means, and the identification unit 240 identifies the detection target object, based on a positional relationship between the detected two detection areas. Thereby, occurrence of erroneous detection or detection failure of a detection target object by one recognition means can be suppressed, and detection accuracy of the detection target object can be improved. Moreover, since detection processing is executed by converting three-dimensional information into a two-dimensional image by the image generation unit 220, a load of processing can be reduced, and processing efficiency can be improved.

Second Example Embodiment

FIG. 6 is a functional block diagram illustrating a configuration example of a target object detection apparatus 20 of the present example embodiment. The target object detection apparatus 20 of the present example embodiment includes a configuration that executes area detection of a detection target object with use of the recognition means of the above-described (a1). Specifically, the target object detection apparatus 20 includes a configuration in which a two-dimensional image 222a viewed from a predetermined direction (angle A) and a two-dimensional image 222b viewed from a direction (angle B) being different from the angle A are generated, and a detection target object is identified by using a position (a second detection area 232b to be described later) of the detection target object recognized by using the two-dimensional image 222b of the angle B, and a position (an estimation area 262 to be described later) of the detection target object viewed from the angle B, which is estimated by using the two-dimensional image 222a of the angle A. When a position of the detection target object viewed from the angle B is estimated by using the two-dimensional image 222a of the angle A, depth information (distance information 224 to be described later) of the detection target object at the angle A is used.

The target object detection apparatus 20 of the present example embodiment includes an acquisition unit 210, an image generation unit 220a, an image generation unit 220b, an area detection unit 230a, an area detection unit 230b, an estimation unit 260, and an identification unit 240.

The acquisition unit 210 acquires three-dimensional information 212 acquired by processing a reflection wave of an electromagnetic wave irradiated toward an inspection target, and outputs the acquired three-dimensional information 212 to the image generation units 220a and 220b. The image generation unit 220a generates, from the three-dimensional information 212, a first two-dimensional image 222a at a time of viewing the inspection target from a first direction (angle A). In addition, the image generation unit 220a generates distance information 224 to a reflection point of each of pixels constituting the first two-dimensional image 222a. The image generation unit 220b generates, from the three-dimensional information 212, a second two-dimensional image 222b at a time of viewing the inspection target from a second direction (angle B) being different from the first direction (angle A).

The area detection unit 230a detects, from the first two-dimensional image 222a, a first detection area 232a in which the detection target object is estimated to be present. The area detection unit 230b detects, from the second two-dimensional image 222b, a second detection area 232b in which the detection target object is estimated to be present.

With respect to the detection target object viewed from the first direction (angle A), the estimation unit 260 estimates an area in which the detection target object is present when viewed from the second direction (angle B), based on a detection area detected by the area detection unit 230a and the distance information 224 of each position (pixel) of the detection area, and sets the estimated area as an estimation area 262. The details of an estimation method of the estimation area 262 will be described later.

The identification unit 240 identifies whether to be the detection target object, based on a positional relationship between the estimation area 262 estimated by the estimation unit 260 when viewed from either one direction (in this example, angle B) of the first direction (angle A) and the second direction (angle B), and the detection area 232b detected by the area detection unit 230b. The details of an identification method of the identification unit 240 will be described later.

FIG. 7 is a diagram for describing a detection result when different objects are recognized from a two-dimensional image 222. FIG. 7A illustrates an example in which a detection target object 62 accompanies a non-detection target 64. FIG. 7B illustrates an example in which an inspection target 66 being a non-detection target further accompanies the non-detection target 64. Each figure of FIG. 7 is a cross-sectional view at a height y1 of the detection target object 62, the non-detection target 64, and the inspection target 66. In the present figure, a y axis is not illustrated. In addition, each area in an x-y direction and a z-y direction is not illustrated.

Figure 7A:
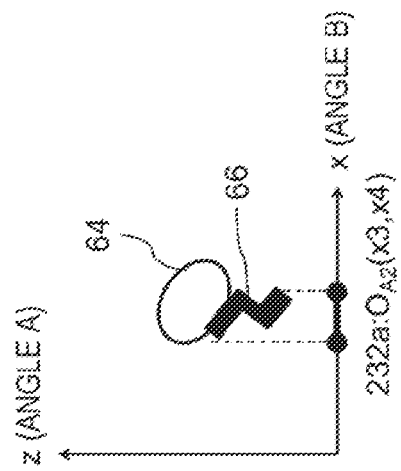
FIGS. 7A to 7D are diagrams for each describing a difference between detection areas when a detection target object is recognized from a two-dimensional image viewed from different directions.
Figure 7C:
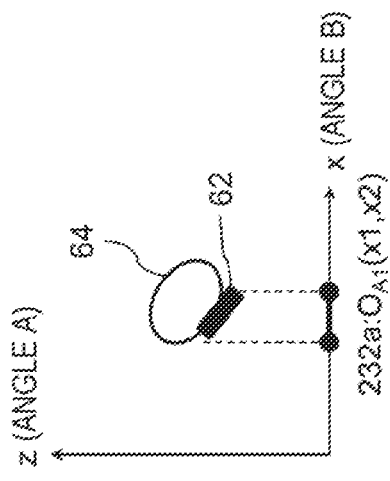
Figure 7B:
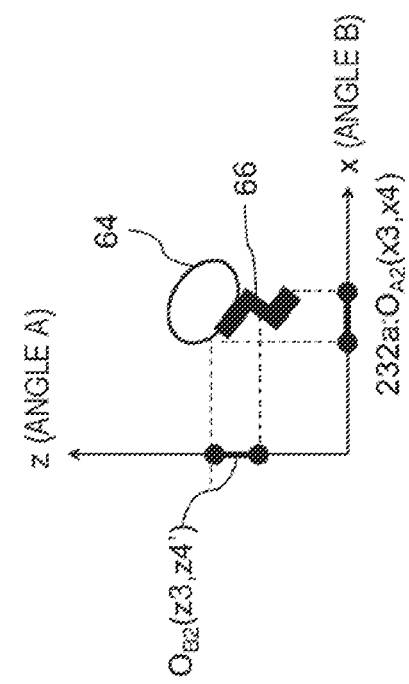

FIGS. 7A and 7B illustrate a range of the first detection area 232a being detected in regard to the detection target object 62 and a range of the inspection target 66 having mutually different shapes, respectively, when the angle A (in this example, a direction parallel to the z axis) is set as a line-of-sight direction. The range of the first detection area 232a, which is detected by the area detection unit 230a when the detection target object 62 in FIG. 7A is viewed from the angle A, is $O_{A1}$(x1, x2). The range of the first detection area 232a, which is detected by the area detection unit 230a when the inspection target 66 in FIG. 7B is viewed from the angle A, is $O_{A2}$(x3, x4). Herein, since the shapes of the detection target object 62 and the inspection target 66 are similar when viewed from the angle A, an area $O_{A1}$(x1, x2) of the detection target object 62 in FIG. 7A and an area $O_{A2}$(x3, x4) of the inspection target 66 in FIG. 7B have the same range.

Thus, despite the detection target object 62 and the inspection target 66 actually being objects of different shapes, when identification is executed by using the first detection area 232a detected by the area detection unit 230a, the inspection target 66 is detected as being the detection target object 62. In this manner, when an object is to be detected based on a shape viewed from only one direction, there is a possibility of erroneous detection, and there is a possibility that detection accuracy of the detection target object 62 lowers.

Figure 7D:
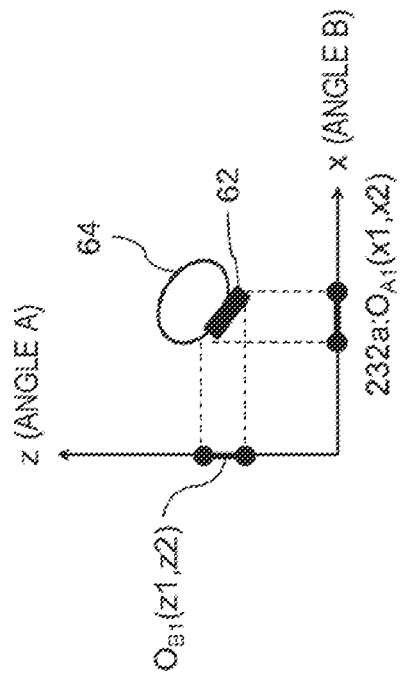

On the other hand, as illustrated in FIGS. 7C and 7D, the shape of the inspection target 66, in a case where the angle B (in this example, a direction parallel to the x axis) being different from the angle A is set as the line-of-sight direction, is partly similar to the shape of the detection target object 62. Thus, despite the detection target object 62 and the inspection target 66 actually having different shapes, an area $O_{B2}$(z3, z4') of the inspection target 66, which is detected by the area detection unit 230b when viewed from the angle B, has, in some cases, the same value as an area $O_{B1}$(z1, z2) of the detection target object 62, which is detected by the area detection unit 230b. In other words, the inspection target 66 is erroneously detected as having a shape different from the actual shape.

As a result, in this case, too, despite the two objects, namely the detection target object 62 and inspection target 66, actually being objects of different shapes, the inspection target 66 is detected as being the detection target object 62. In this manner, even when an object is to be detected based on the shape viewed from two directions, there is a possibility of erroneous detection, and there remains a possibility that detection accuracy of the detection target object 62 lowers.

As described above, depending on a shape of an inspection target, there is a possibility that detection accuracy lowers. Accordingly, in the present example embodiment, the detection accuracy of the detection target object 62 is improved by using various methods.

Figure 8A:
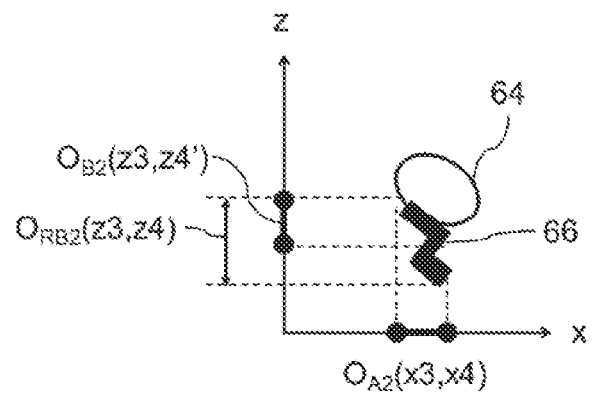
FIGS. 8A and 8B are diagrams for each describing an estimation area estimated by an estimation unit.
Figure 8B:
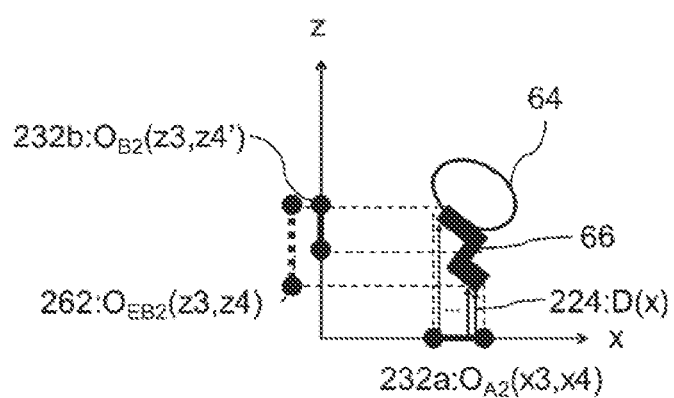

FIG. 8 is a diagram for describing the estimation area 262 estimated by the estimation unit 260. As illustrated in FIG. 8A, the second detection area 232b, which is detected by the area detection unit 230b from the second two-dimensional image 222b of the inspection target 66 viewed from the angle B, is $O_{B2}$ (z3, z4'). This is narrower than $O_{RB2}$ (z3, z4) (FIG. 8A) being a range of the actual inspection target 66.

The estimation unit 260 estimates a range of $O_{EB2}$(z3, z4), as the estimation area 262 of the inspection target 66, from the first detection area 232a detected by the area detection unit 230a, and the distance information 224 (D(x)) of each of pixels (x3 to x4) of the first detection area 232a, which is generated by the image generation unit 220a. The estimation area 262 is different from the range of $O_{B2}$ (z3, z4') of the second detection area 232b detected from the second two-dimensional image 222b with the angle B being set as the line-of-sight direction in FIG. 8A, and a value substantially equal to $O_{RB2}$(z3, z4) of the range of the actual inspection target 66 is acquired. In this manner, the shape of the inspection target 66 is correctly detected by the estimation unit 260.

Figure 9A:
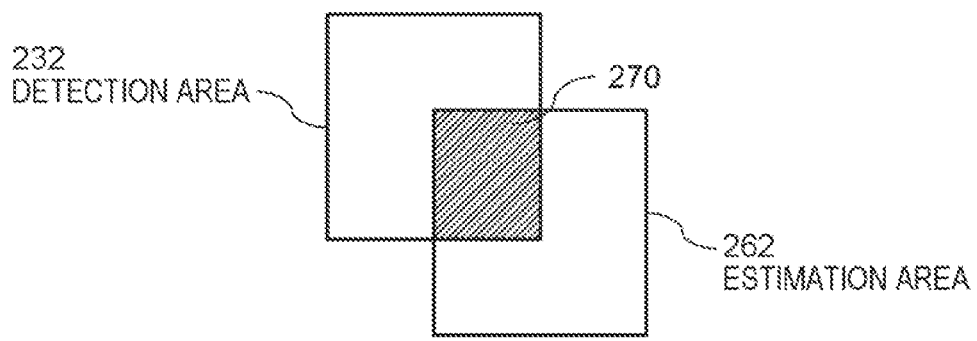
FIGS. 9A and 9B are diagrams for each describing an identification method of an identification unit.
Figure 9B:
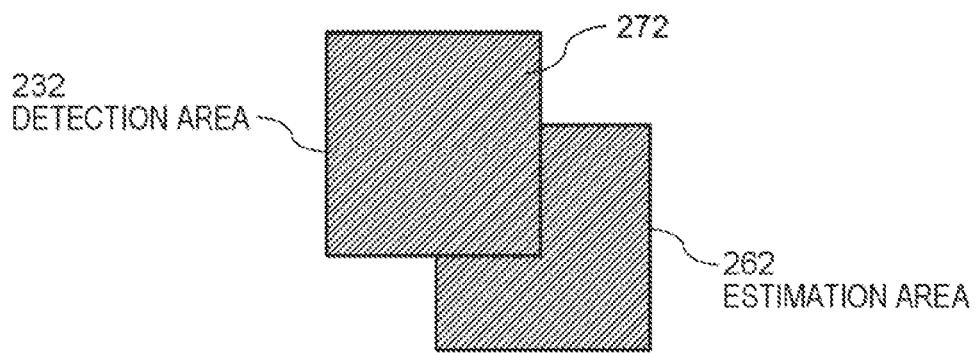

Next, the details of the identification method of the identification unit 240 are described. FIG. 9 is a diagram for describing the identification method of the identification unit 240, and illustrates a positional relationship between the detection area 232 and the estimation area 262.

The positional relationship between the detection area 232 and the estimation area 262 is indicated by a ratio R between an area AI of a region 270 in which the two areas overlap, and an area AU of a region 272 in which the two areas are combined (an equation (1)). In other words, a degree of agreement between the two areas is indicated by the ratio R.

$$R = AI/AU \qquad \text{Equation (1)}$$

Figure 10:
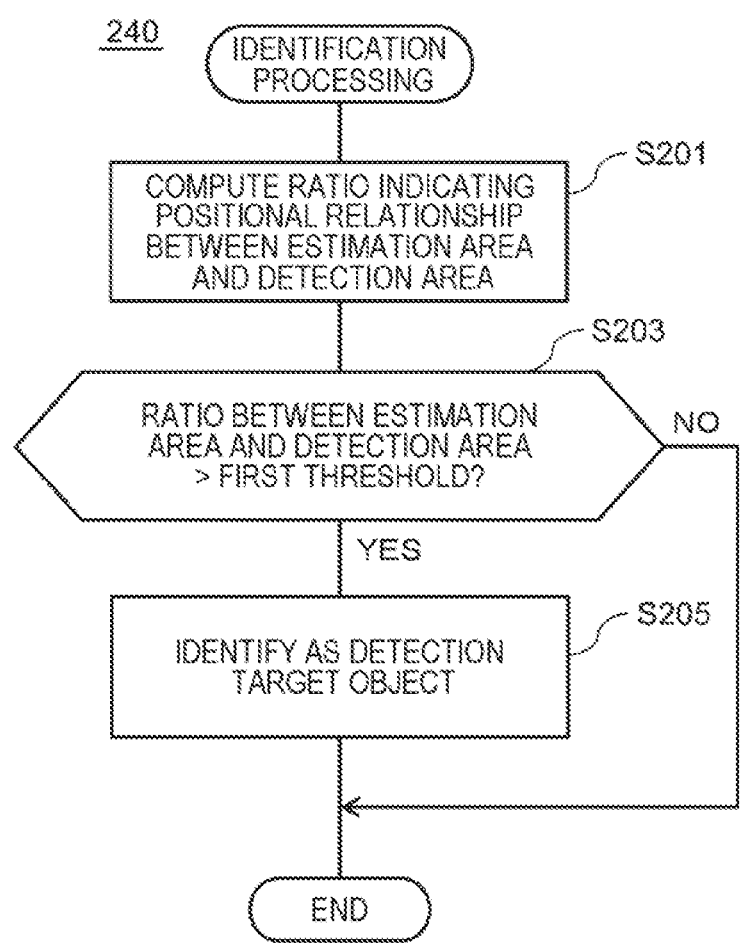
FIG. 10 is a flowchart illustrating procedures for identification processing of the identification unit.
Figure 11:
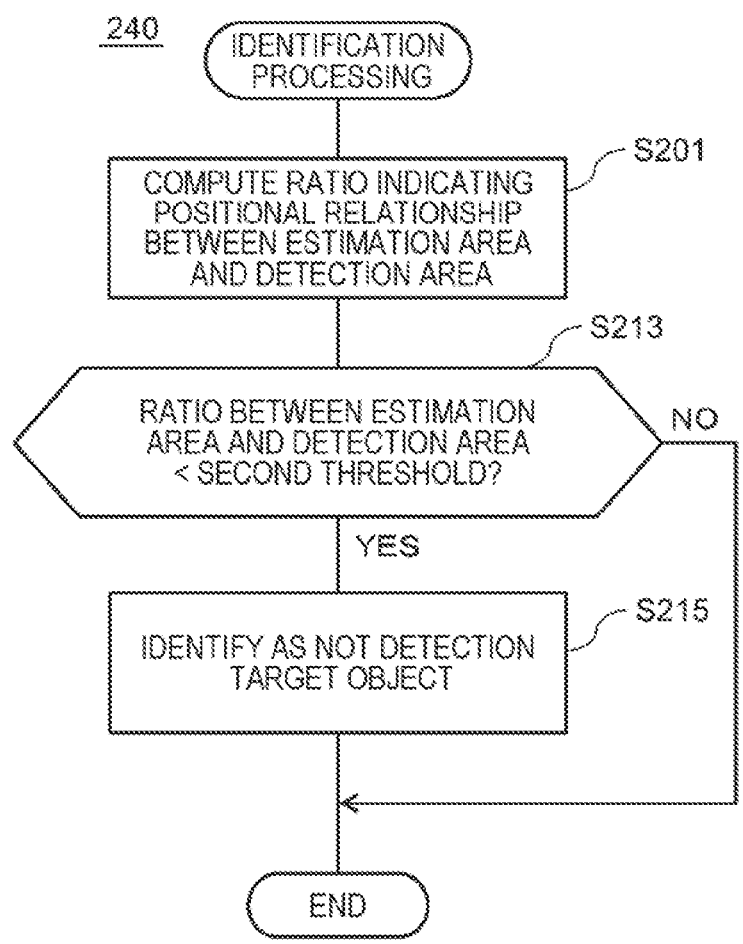
FIG. 11 is a flowchart illustrating procedures for identification processing of the identification unit.

FIGS. 10 and 11 are flowcharts illustrating procedures for identification processing of the identification unit 240.

First, as illustrated in FIG. 10, the identification unit 240 computes the ratio R (step S201). Then, when the ratio R is more than a first threshold (for example, 0.7) (YES in step S203), the identification unit 240 identifies a detected object as being the detection target object 62 (step S205).

Next, as illustrated in FIG. 11, the identification unit 240 computes the ratio R (step S201). Then, when the ratio R is less than a second threshold (for example, 0.3) (YES in step S213), the identification unit 240 identifies the detected object as not being the detection target object 62 (in other words, erroneous detection), and the detection target object 62 is not identified (step S215).

The flowchart in FIG. 10 and the flowchart in FIG. 11 can also be combined. After computing the ratio R in step S201, the identification unit 240 may execute the identification processing by using the first threshold in step S203, and execute the identification processing by using the second threshold in step S213 with respect to the detected object being identified as not being the detection target object 62 (NO in step S203). Alternatively, the identification of step S213 may be executed prior to the identification of step S203.

Various methods are conceivable for a computation method of the distance information 224 in the image generation unit 220 and the estimation method of the estimation area 262 by the estimation unit 260, and the details of such methods will be described later.

According to the present example embodiment, the estimation unit 260 estimates, from the first detection area 232a of the inspection target 66 with a predetermined direction (for example, angle A) being set as the line-of-sight direction, the estimation area 262 with another direction (for example, angle B) different from the angle A being set as the line-of-sight direction, and the identification unit 240 identifies whether the inspection target 66 is the detection target object 62, based on the positional relationship between the estimation area 262 and the second detection area 232b. Besides, the positional relationship between the estimation area 262 and the second detection area 232b is identified by the identification unit 240, based on the degree of agreement of the areas.

In this manner, since the estimation unit 260 can estimate, based on distance information of a detection area in one line-of-sight direction, the other area, and the identification unit 240 can comprehensively make identification, based on the detected area and the estimated area, identification accuracy of the detection target object 62 can be improved even when the inspection target 66 has a shape being partly similar to a shape of the detection target object 62. Moreover, since the positional relationship between the areas can be identified based on the degree of agreement of the areas, the detection target object 62 can efficiently be identified.

Modification of the Second Example Embodiment

Figure 12:
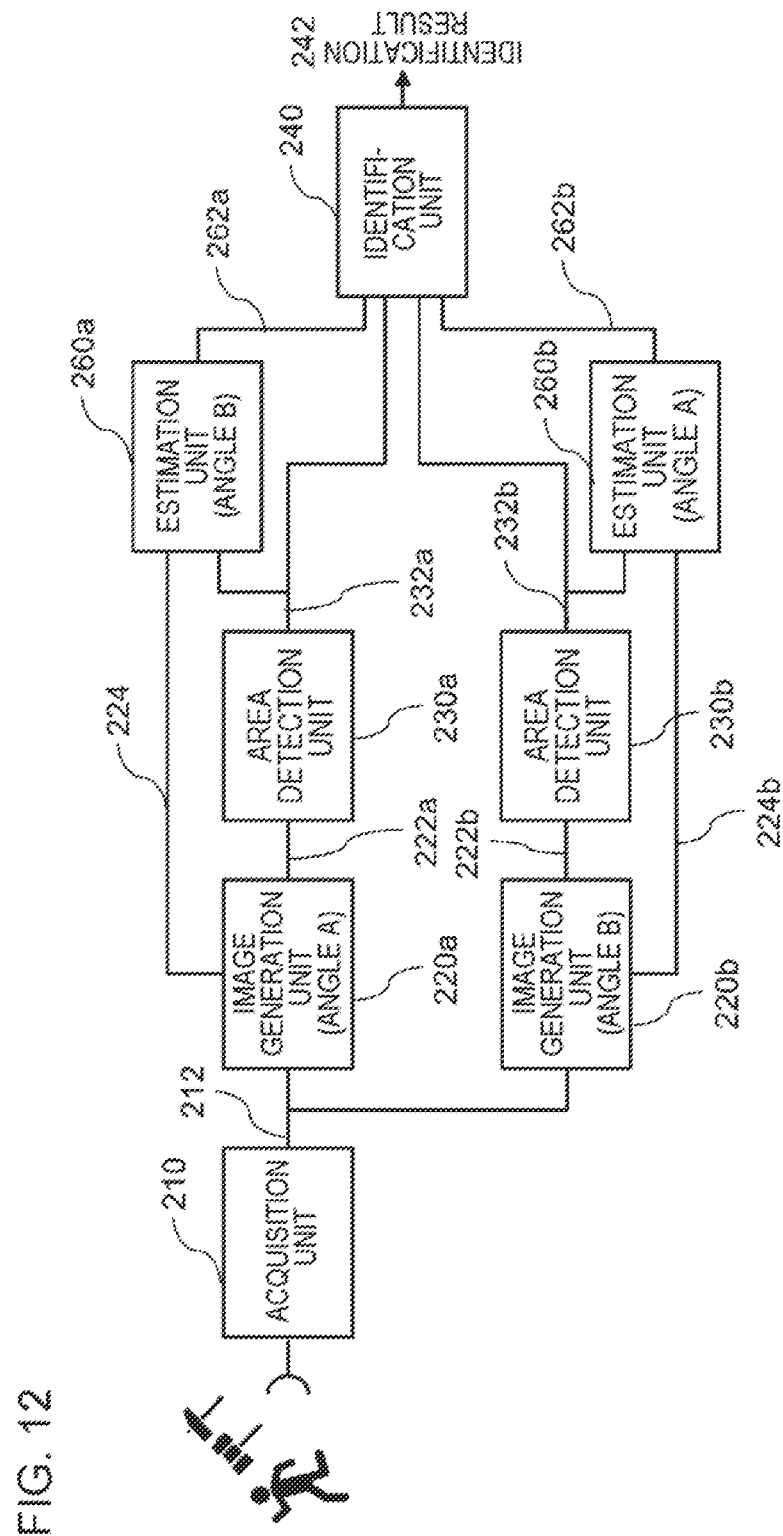
FIG. 12 is a functional block diagram illustrating a configuration example of a target object detection apparatus of a modification of a second example embodiment.

FIG. 12 is a functional block diagram illustrating a configuration example of a target object detection apparatus 20 of a modification of the second example embodiment. The target object detection apparatus 20 includes an estimation unit 260a and an estimation unit 260b in place of the estimation unit 260 of the target object detection apparatus 20 in FIG. 6.

With respect to an object recognized as a detection target object viewed from a first direction (angle A), the estimation unit 260a estimates, based on a detection area detected by an area detection unit 230a and distance information 224 of each position of the detection area, an estimation area 262a in which a detection target object 62 being the object recognized as the detection target object, which is viewed from a second direction (angle B), is estimated to be present.

The estimation unit 260b estimates an estimation area 262b in which the detection target object 62 viewed from the angle A, which is estimated from a second detection area 232b detected from a second two-dimensional image 222b viewed from a second angle (angle B), is estimated to be present.

The identification unit 240 identifies whether to be the detection target object 62, based on a positional relationship between the estimation area 262a estimated by the estimation unit 260a and the second detection area 232b, and a positional relationship between the estimation area 262b estimated by the estimation unit 260b and a first detection area 232a.

The similar advantageous effects as in the second example embodiment are acquired, and, moreover, detection accuracy of the detection target object 62 can be further improved since detection areas 232 are detected from two-dimensional images 222 of the detection target object 62 with the first direction and second direction being set as the line-of-sight directions, the estimation areas 262, which are estimated from both detection areas 232 and in which the detection target object 62 with the other direction being set as the line-of-sight direction is estimated to be present, are estimated, and identification is comprehensively executed by the identification unit 240.

Third Example Embodiment

A target object detection apparatus 20 of the present example embodiment is similar to the above example embodiments, except that distance information 224 of a detection target object 62 is stored in advance, and that the distance information 224 is used for estimating an estimation area 262. Since the target object detection apparatus 20 of the present example embodiment includes similar configuration as the target object detection apparatus 20 in FIG. 3, the target object detection apparatus 20 is described with reference to FIG. 3. The target object detection apparatus 20 of the present example embodiment can be combined with at least one of other configurations as long as no inconsistency occurs.

The distance information 224 of the detection target object 62 is stored in advance in a storage apparatus 250. The estimation unit 260 estimates the estimation area 262 in which the detection target object 62 is estimated to be present when the detection target object 62 is viewed from a second direction, based on the distance information 224 of the detection target object 62, which is stored in the storage apparatus 250.

According to the present example embodiment, since the estimation unit 260 can estimate the estimation area 262 by using the distance information 224 of the detection target object 62 being stored in advance, there is no need to use the distance information 224 generated by an image generation unit 220, and therefore a load of computation processing of the estimation area 262 by the estimation unit 260 can be reduced, and processing efficiency can be improved. In particular, when a detection area 232 of the detection target object 62 is erroneously detected, useless processing can be omitted since there is no need to execute estimation processing of the estimation area 262 by using the erroneous detection area 232 and the erroneous distance information 224, and detection accuracy of the detection target object 62 can be improved since the estimation area 262 can be estimated by using the correct distance information 224.

Fourth Example Embodiment

Figure 13:
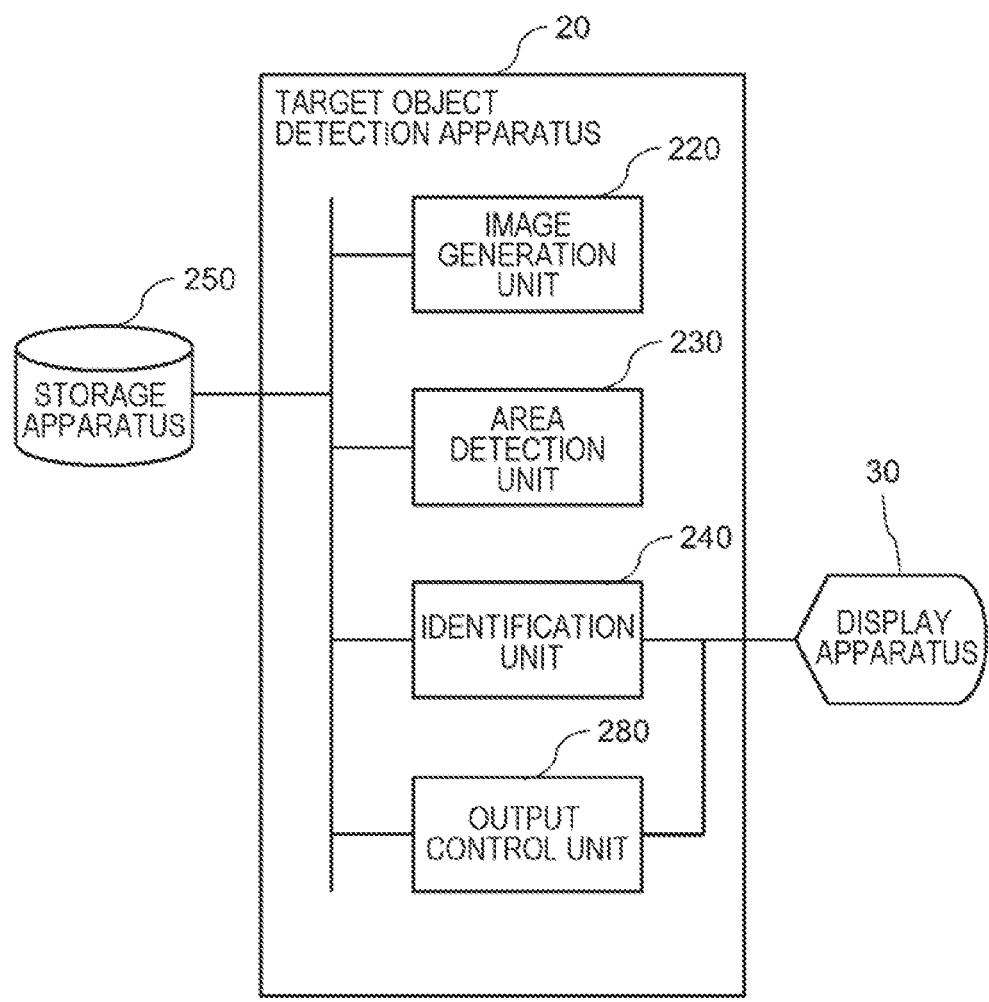
FIG. 13 is a functional block diagram illustrating a configuration example of the target object detection apparatus of the present example embodiment.

FIG. 13 is a functional block diagram illustrating a configuration example of a target object detection apparatus 20 of the present example embodiment.

The target object detection apparatus 20 of the present example embodiment is similar to the target object detection apparatus 20 in FIG. 3, except that the target object detection apparatus 20 includes a configuration that controls output of an identification result. The target object detection apparatus 20 includes an output control unit 280, in addition to the configuration of the target object detection apparatus 20 in FIG. 3. The target object detection apparatus 20 of the present example embodiment can be combined with at least one of other configurations within as long as no inconsistency occurs.

When the identification unit 240 makes identification as a detection target object 62, the output control unit 280 outputs the identification result, and when the identification unit 240 makes identification as not the detection target object 62, the output control unit 280 does not output the identification result.

An output means, by which the output control unit 280 outputs the identification result, is, for example, a display apparatus 30. Alternatively, the identification result may be stored in a storage apparatus 250. Alternatively, voice or an alarm sound may be output from a speaker. Information being output can include at least one of information indicating detection of the detection target object 62, information indicating the detection target object 62 being detected, and information indicating date/time of the detection and a location of the detection.

Figure 14:
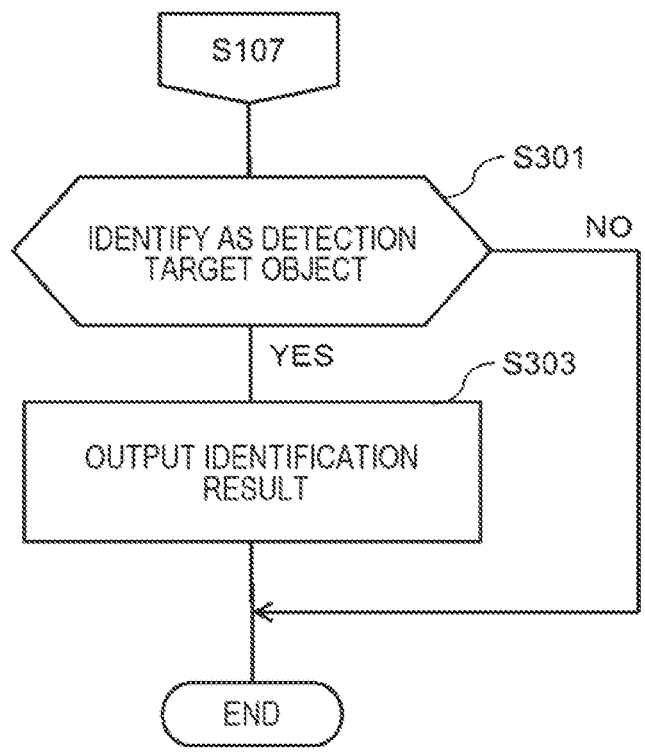
FIG. 14 is a flowchart illustrating an operation example of the target object detection apparatus.

FIG. 14 is a flowchart illustrating an operation example of the target object detection apparatus 20.

A flow of the present figure is executed after step S107 in FIG. 5. In an identification result by the identification unit 240 in step S107, when a recognized object is identified as being the detection target object 62 (YES in step S301), a fact that the detected object is the detection target object 62 is output as the identification result (step S303). On the other hand, when the recognized object is not identified as being the detection target object 62, or when the recognized object is identified as not being the detection target object 62 (NO in step S301), step S303 is bypassed and the present processing ends. In other words, in this case, the output control unit 280 does not output the identification result.

Besides, in another example, when a detection area 232 is identified as the detection target object 62 (YES in step S301), the output control unit 280 may display the detection area 232 in a two-dimensional image 222 with emphasis, such as by changing a color of the detection area 232, or by displaying an image surrounding the detection area 232 in a superimposed manner.

In still another example, when a recognized object is not identified as being the detection target object 62, or when the recognized object is identified as not being the detection target object 62 (NO in step S301), the output control unit 280 may display the detection area 232 in the two-dimensional image 222 with emphasis, such as by changing a color of the detection area 232 to a color different from the above-described detection area 232 of the detection target object 62, or by displaying an image surrounding the detection area 232 in a superimposed manner, the image being different from the above-described image surrounding the detection image 232 of the detection target object 62. Thereby, a person can also confirm an object being identified as not being the detection target object 62

According to the present example embodiment, the output control unit 280 can control whether to output an identification result of detection of the detection target object 62. For example, the number of pieces of notification information can be reduced to a proper number, by issuing a notification when it is identified that the detection target object 62 is detected, but by not issuing a notification when it is identified as not the detection target object 62. Thereby, a work load of a manager can be reduced. However, where necessary, even when it is identifies as not the detection target object 62, a notification may be issued in such a way as to enable a person to make visual confirmation, or confirmation may be performed later. Thereby, detection failure of the detection target object 62 can be prevented, and erroneous detection can be reduced.

Fifth Example Embodiment

FIG. 15 is a functional block diagram illustrating a configuration example of a target object detection apparatus 20 of the present example embodiment.

The target object detection apparatus 20 is configured to execute area detection of a detection target object by using the recognition means of the above-described (a2). Specifically, the recognition means recognizes each of two different detection target objects from one two-dimensional image viewed from a predetermined direction.

The target object detection apparatus 20 includes an acquisition unit 210, an image generation unit 220, an area detection unit 230a, an area detection unit 230c, and the identification unit 240.

The acquisition unit 210 is similar to that of the above example embodiments in FIGS. 6 and 12. The image generation unit 220 generates, from three-dimensional information 212, a two-dimensional image 222 of an inspection target viewed from a predetermined direction (for example, angle A). The area detection unit 230a includes a detection target object detection unit (not illustrated) that detects a first detection target object 62a. The area detection unit 230c includes a non-detection target object detection unit (not illustrated) that detects a second detection target object 62b being different from the first detection target object 62a.

The first detection target object 62a is, for example, an object of a detection target, and an example of the first detection target object 62a is an article, carrying-in of which is restricted, including a controlled article such as a dangerous weapon, a dangerous article, and an illegal article. The second detection target object 62b is, for example, an object other than the detection target, and an example of the second detection target object 62b includes an article (for example, a body, or an arm) other than a controlled article.

It is preferable that a combination between the first detection target object 62a and the second detection target object 62b is, for example, a combination of objects which are mutually associated in positional relationship, such as a "gun" and a "person's arm". Alternatively, a combination between the first detection target object 62a and the second detection target object 62b may be, for example, a combination of objects having similar shapes, such as a "gun" and a "person's arm".

The area detection unit 230a detects a first detection area 232a of the first detection target object 62a by using the detection target object detection unit. The area detection unit 230c detects a third detection area 232c of the second detection target object 62b by using the non-detection target object detection unit.

The identification unit 240 identifies whether to be the first detection target object 62a, based on a positional relationship between the first detection area 232a of the detected first detection target object 62a being detected and the third detection area 232c of the second detection target object 62b.

Figure 16A:
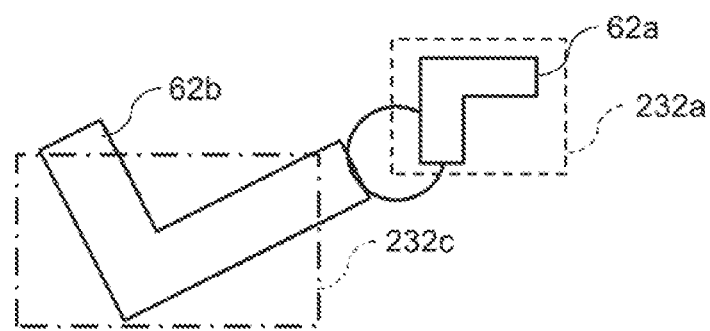
FIGS. 16A and 16B are diagrams for each describing an identification method of a first detection target object and a second detection target object by the target object detection apparatus.

FIG. 16A is a diagram for describing an identification method of the first detection target object 62a and the second detection target object 62b by the target object detection apparatus 20 of the present example embodiment. Herein, the first detection target object 62a is a gun, and the second detection target object 62b is a person's arm. The first detection area 232a of the first detection target object 62a (gun) is detected by the area detection unit 230a. On the other hand, the third detection area 232c (indicated by a dot-and-dash line in the figure) of the second detection target object 62b (person's arm) is detected from the area detection unit 230c.

For example, since a positional relationship between the first detection target object 62a (gun) and the second detection target object 62b (person's arm) does not greatly change, the positional relationship is registered in a storage apparatus 250 in advance. Thereby, based on the relationship between the detected first detection area 232a and third detection area 232c, the identification unit 240 identifies the first detection target object 62a (gun) and the second detection target object 62b (person's arm). However, it suffices that the identification unit 240 can identify at least the first detection target object 62a (gun).

According to the present example embodiment, an area of the first detection target object 62a (for example, a gun) and an area of the second detection target object 62b each are detected, and, based on a positional relationship between the detected areas, each of the detection target objects 62 can be identified, and thus, compared to a case of identifying only the first detection target object 62a (for example, a gun), there is a possibility that erroneous detection or detection failure can be reduced. Therefore, detection efficiency of the detection target object can be improved.

Modification of the Fifth Example Embodiment

FIG. 17 is a functional block diagram illustrating a configuration example of a target object detection apparatus 20 of a modification of the fifth example embodiment. In this example, the target object detection apparatus 20 includes an estimation unit 260 in addition to the configuration of the target object detection apparatus 20 in FIG. 15. The estimation unit 260 is similar to the estimation unit 260 and the estimation unit 260a of the target object detection apparatus in FIGS. 6 and 12.

The estimation unit 260 estimates an estimation area 262 of a line-of-sight direction of angle B, in which a detection target object 62 is estimated to be present, with respect to a first detection area 232a detected from a first two-dimensional image 222a of the line-of-sight direction of angle A.

Figure 16B:
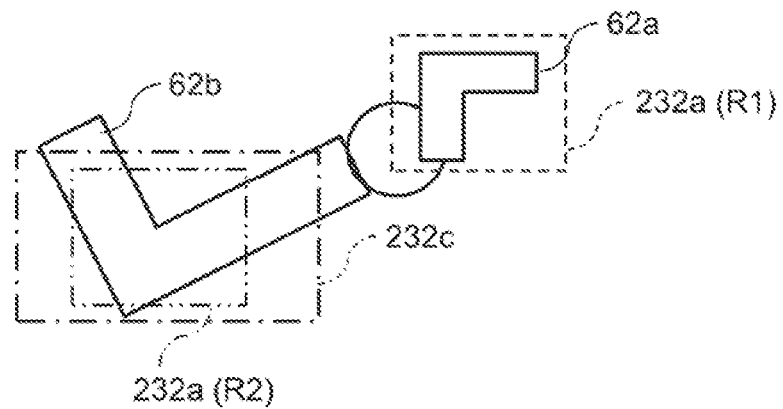

FIG. 16B is a diagram for describing an identification method of a first detection target object 62a and a second detection target object 62b by the target object detection apparatus 20 of the modification of the example embodiment. Herein, the first detection target object 62a is a gun, and the second detection target object 62b is a person's arm. When the second detection target object 62b (person's arm) is erroneously detected as the first detection target object 62a (gun) by an area detection unit 230c, for example, two areas, i.e., an area R1 (indicated by a broken line in the figure) and an area R2 (indicated by a two-dot-and-dash line in the figure), are detected from an area detection unit 230a as the first detection areas 232a. On the other hand, a third detection area 232c (indicated by a dot-and-dash line in the figure) of the second detection target object 62b (person's arm) is detected from an area detection unit 230c.

Then, with respect to the area R1 and area R2, the estimation unit 260 estimates each of areas 262 (area RE1 and area RE2 (not shown)) with the line-of-sight direction of angle B. Then, based on a positional relationship between the estimated two areas, i.e., the area RE1 and area RE2, and the third detection area 232c, the identification unit 240 identifies the first detection target object 62a (gun)

Herein, since a position of the area RE2 agrees with a position of the third detection area 232c, the area R2 detected as the first detection target object 62a (gun) is identified as being the detection target object 62b (person's arm). On the other hand, since a position of the area RE1 does not agree with the position of the third detection area 232c, the area R1 detected as the first detection target object 62a (gun) is identified as not being the detection target object 62b (person's arm).

Figure 19:
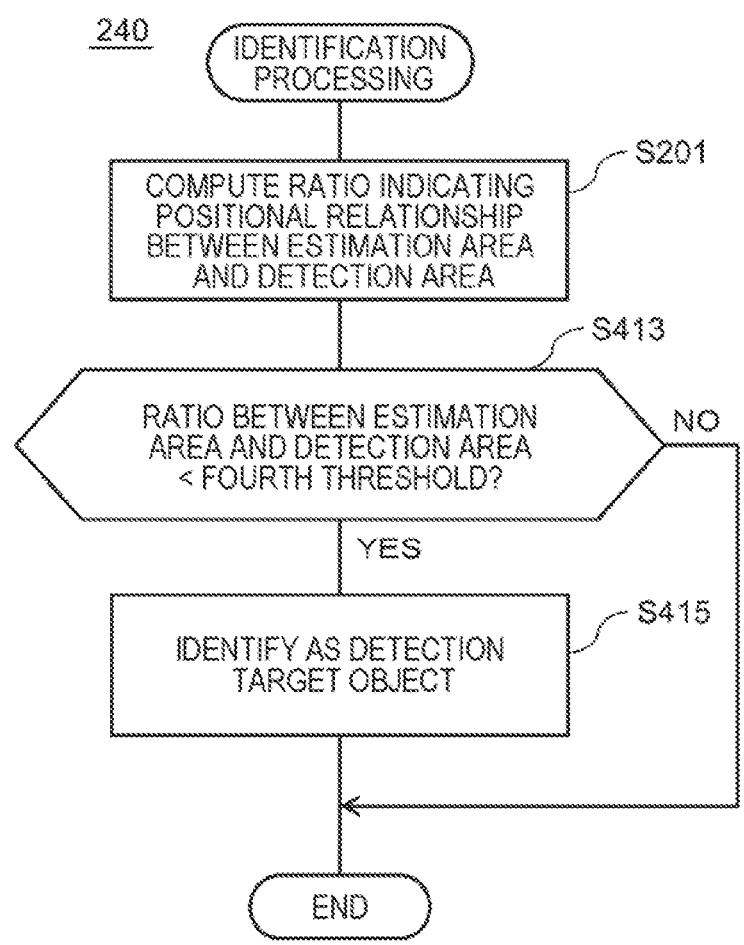
FIG. 19 is a flowchart illustrating procedures for identification processing of the identification unit.

Hereinafter, the details of the identification method based on a positional relationship between two areas in the identification unit 240 are described. The description is given with reference to flowcharts of FIGS. 18 and 19. In FIGS. 18 and 19, the same steps as in FIGS. 10 and 11 are denoted by the same reference signs, and a description thereof is omitted.

First, as illustrated in FIG. 18, when a ratio R is more than a third threshold (for example, 0.7) (YES in step S403), the identification unit 240 identifies a detected object as not being the detection target object 62 (in other words, erroneous detection), and the detection target object 62 is not detected (step S405).

Next, as illustrated in FIG. 19, when the ratio R is less than a fourth threshold (for example, 0.3) (YES in step S413), the identification unit 240 identifies the detected object as being the detection target object 62 (step S415).

The flowchart in FIG. 18 and the flowchart in FIG. 19 can also be combined. After computing the ratio R in step S201, the identification unit 240 may execute the identification processing by using the third threshold in step S403, and execute the identification processing by using the fourth threshold in step S413 with respect to the detected object being identified as being the detection target object 62 (NO in step S403). Alternatively, the identification of step S413 may be executed prior to the identification of step S403.

According to the modification of the example embodiment, similar advantageous effects as in the above-described fifth example embodiment can be acquired, and, moreover, since a detection target object and an object other than the detection target object are detected, the identification of the combination of the two detection manners may be executed, and therefore detection failure and erroneous detection can be reduced. Furthermore, since an estimation area can be detected by the estimation unit 260, detection accuracy can be further improved.

While the example embodiments have been described with reference to the drawings, these example embodiments are exemplification of the present invention, and various configurations other than the above can be adopted.

<Computation Method of Distance Information 224 in Image Generation Unit 220>

Figure 20:
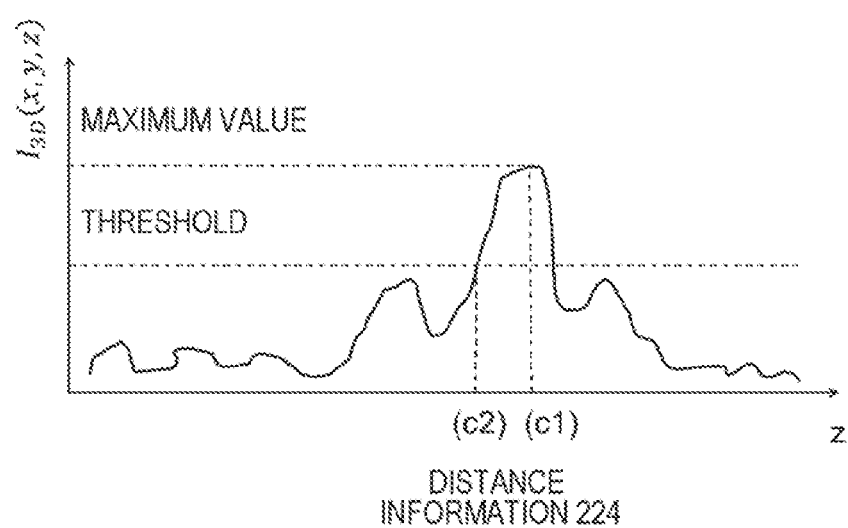
FIG. 20 is a diagram for describing an example of a computation method of distance information in an image generation unit.

FIG. 20 is a diagram for describing an example of a computation method of distance information 224 in an image generation unit 220. The image generation unit 220 can generate the distance information 224 by using any one of the following computation methods (c1) to (c3), but the computation methods are not limited to these.

Hereinafter, a description is given of a case where a line-of-sight direction (predetermined direction) of a two-dimensional image 222 is a z direction, that is, a direction parallel to a direction of irradiation of an electromagnetic wave.

(c1) A voxel, at which amplitude of a radar image (three-dimensional information 212) in the line-of-sight direction (z direction) becomes maximum, is selected, and an amplitude value thereof is set as a value $I_{2D}(x, y)$ of the two-dimensional image 222. In addition, z coordinates of the value are set as $D(x, y)$ of the distance information 224. These are computed by the following equations (2) and (3).

[Math. 1]

$$I_{2D}(x, y) = \max_{z} I_{3D}(x, y, z) \quad \text{Equation (2)}$$

$$D(x, y) = \operatorname*{argmax}_{z} I_{3D}(x, y, z) \quad \text{Equation (3)}$$

(c2) A voxel, at which the amplitude of the radar image (three-dimensional information 212) in the line-of-sight direction (z direction) first exceeds a predetermined threshold, is selected, and the amplitude value thereof is set as a value $I_{2D}(x, y)$ of the two-dimensional image 222. In addition, the z coordinates of the value are set as $D(x, y)$ of the distance information 224.

(c3) A voxel, which becomes a center-of-gravity of the amplitude of the radar image (three-dimensional information 212) in the line-of-sight direction (z direction), is selected, and the amplitude value thereof is set as a value $I_{2D}(x, y)$ of the two-dimensional image 222. In addition, the z coordinates of the value are set as $D(x, y)$ of the distance information 224. These are computed by the following equations (4) and (5).

[Math. 2]

$$D(x, y) = \frac{\sum_{z} I_{3D}(x, y, z) \times z}{\sum_{z} I_{3D}(x, y, z)} \quad \text{Equation (4)}$$

$$I_{2D}(x, y) = I_{3D}(x, y, D(x, y)) \quad \text{Equation (5)}$$

<Estimation Method of Estimation Area 262 by Estimation Unit 260>

FIG. 21 is a diagram for describing an example of an estimation method of an estimation area 262 in an estimation unit 260. The estimation unit 260 may estimates the estimation area 262 by using any one of the following computation methods (d1) to (d4), but the computation methods are not limited to these.

Figure 21A:
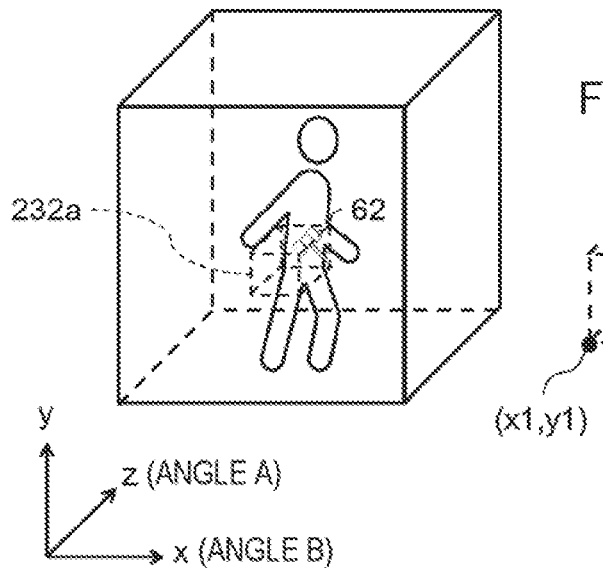
FIGS. 21A and 21B are diagrams for each describing an example of an estimation method of an estimation area in an estimation unit.

Hereinafter, a description is given of a case where, as illustrated in FIG. 21A, a line-of-sight direction (predetermined direction) of a first two-dimensional image 222a is a z direction (angle A), that is, a direction parallel to a direction of irradiation of an electromagnetic wave, and the line-of-sight direction, in which a detection target object 62 is estimated to be present by the estimation unit 260, is parallel to an x direction (angle B). In addition, FIG. 21C is a cross-sectional view between heights y1 and y2, and, in the FIG. 21C, an illustration relating to a y direction is omitted.

Figure 21B:
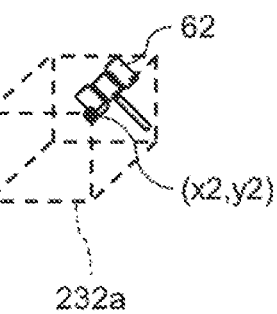
Figure 21C:
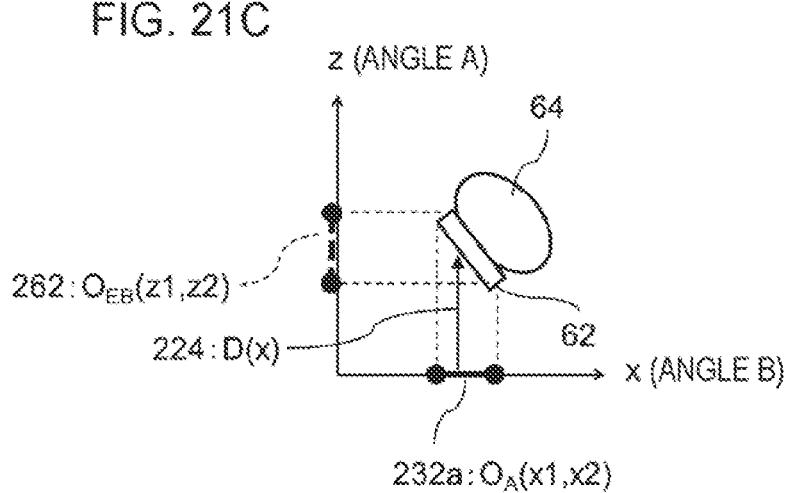

(d1) An area detection unit 230a detects a first detection area 232a of the detection target object 62 being detected from a first two-dimensional image 222a of the line-of-sight direction angle A, and estimates, as $O_{EB}(z1, y1, z2, y2)$, the estimation area 262 of a target object viewed from the line-of-sight direction angle B, by using $O_A(x1, y1, x2, y2)$ in FIG. 21B and $D(x, y)$ of the distance information 224 in the first detection area 232a in FIG. 21C.

Herein, z1 is a minimum value of the distance information 224 in the detection area 232a, and is computed by the following equation (6).

[Math. 3]

$$z_1 = \min_{x_1 \leq x \leq x_2, y_1 \leq y \leq y_2} D(x, y) \quad \text{Equation (6)}$$

In addition, z2 is a maximum value of the distance information 224 in the first detection area 232a, and is computed by the following equation (7).

[Math. 4]

$$z_2 = \max_{x_1 \leq x \leq x_2, y_1 \leq y \leq y_2} D(x, y) \quad \text{Equation (7)}$$

(d2) In processing of the above (d1), $O_A(x1, y1, x2, y2)$ of the detection area 232a is a rectangle and includes an area in which the detection target object 62 is not present, and there is a case where z1 and z2 are not correctly computed. In this case, when a value $I_{2D}(x, y)$ of the first two-dimensional image 222a is smaller than a threshold, an area of the value is regarded as a non-target object area and is excluded from a target of the computation processing of the maximum value or minimum value of the above (d1), and thereby z1 and z2 can correctly be computed. As the threshold for the above smallness, a value acquired by multiplying a maximum value of the $I_{2D}(x, y)$ in the detection area by n is used. $0 \leq n \leq 1$, and, for example, 0.1 is used.

(d3) Another method of estimating $O_{EB}(z1, y1, z2, y2)$ of the estimation area 262 without being affected by a non-target object area is a method of using a size of the detection target object 62 as advance knowledge. For example, computation is executed according to the following equations (8) to (10), by using a predetermined size L of the detection target object 62, centering on $D(x, y)$ of the distance information 224 of a position at which $I_{2D}(x, y)$ in the detection area 232a becomes maximum.

[Math. 5]

$$z_1 = D(x_{max}, y_{max}) - L/2 \qquad \text{Equation (8)}$$

$$z_2 = D(x_{max}, y_{max}) + L/2 \qquad \text{Equation (9)}$$

$$(x_{max}, y_{max}) = \underset{x,y}{\operatorname{argmax}}\, I_{2D}(x, y) \qquad \text{Equation (10)}$$

(d4) In the processing of the above (d3), the distance information 224 of a central position or a center-of-gravity position of the detection area 232a, instead of the position at which $I_{2D}(x, y)$ in the detection area 232a becomes maximum, may be used.

<Notification Level>

In a combination between a first detection target object 62a (gun) and a second detection target object 62b (person's arm), according to a positional relationship between these two, the identification unit 240 may change an emergency level of notification of an identification result of the first detection target object 62a.

For example, in a case where the first detection target object 62a (gun) is located on an extension line of the second detection target object 62b (person's arm), that is, in a case of such a positional relationship that the gun is held by a hand, the identification unit 240 may determine a highest level of emergency, compared to cases of other positional relationships. For example, based on the determination result, the output control unit 280 in FIG. 16 can change a notification level and select an output destination and/or an output content.

While the present application of the invention has been particularly described with reference to example embodiments and examples, the present application of the invention is not limited to the example embodiments and examples described above. It will be understood by those of ordinary skill in the art that various changes in form and details may be made therein without departing from the spirit and scope of the present application of the invention as defined by the claims.

Note that, when acquiring and using the information relating to a user in the present invention, this shall be done legally.

A part or the entirety of the above-described example embodiments can be described as in the following supplementary notes, but is not limited to the following.

1. A target object detection apparatus including:
    an image generation unit that generates, from three-dimensional information acquired by processing a reflection wave of an electromagnetic wave irradiated toward an inspection target, a two-dimensional image of the inspection target viewed from a predetermined direction;
    an area detection unit that detects, from the two-dimensional image, each of at least two detection areas of a detection target object recognized by using at least two recognition means; and
    an identification unit that identifies the detection target object, based on a positional relationship between the detected at least two detection areas.
2. The target object detection apparatus according to supplementary note 1, wherein
    the image generation unit
    generates, from the three-dimensional information, a first two-dimensional image of the inspection target when viewed from a first direction, and generates distance information to a reflection point of each of pixels constituting the first two-dimensional image, and
    further generates, from the three-dimensional information, a second two-dimensional image of the inspection target when viewed from a second direction different from the first direction, and generates distance information to a reflection point of each of pixels constituting the second two-dimensional image,
    the area detection unit detects each of, from the first two-dimensional image, a first detection area in which the detection target object is estimated to be present, and, from the second two-dimensional image, a second detection area in which the detection target object is estimated to be present,
    the target object detection apparatus, further including
    an estimation unit that estimates, with respect to the detection target object viewed from the first direction, an area of the detection target object when viewed from the second direction, based on a detection area detected by the area detection unit and the distance information of each of positions of the detection area, and setting the estimated area as an estimation area, wherein
    the identification unit identifies whether to be the detection target object, based on a positional relationship between the estimation area estimated by the estimation unit and the detection area detected by the area detection unit when viewed from the second direction.
3. The target object detection apparatus according to supplementary note 2, wherein
    the estimation unit estimates, with respect to the detection target object viewed from the second direction, an area of the detection target object when viewed from the first direction, based on a detection area detected by the area detection unit and the distance information of each of positions of the detection area, and sets the estimated area as an estimation area, and
    the identification unit identifies whether to be the detection target object, based on a positional relationship between the estimation area and the detection area when viewed from the second direction, and a positional relationship between the estimation area estimated by the estimation unit and the detection area detected by the area detection unit when viewed from the first direction.
4. The target object detection apparatus according to supplementary note 2 or 3, wherein
    the identification unit identifies as the detection target object, when a degree of agreement between the estimation area and the detection area is equal to or more than a first threshold.
5. The target object detection apparatus according to any one of supplementary notes 2 to 4, wherein
    the identification unit identifies as not the detection target object, when a degree of agreement between the estimation area and the detection area is equal to or less than a second threshold.
6. The target object detection apparatus according to any one of supplementary notes 2 to 5, further including
    a storage unit that stores in advance the distance information of the detection target object, wherein
    the estimation unit estimates, based on the distance information of the detection target object stored in advance by the storage unit, an estimation area in which the detection target object is estimated to be present at a time when the detection target object is viewed from the second direction.

7. The target object detection apparatus according to supplementary note 1, wherein the recognition means includes a first detection unit that detects a first detection target object, and a second detection unit that recognizes a second detection target object different from the first detection target object, the area detection unit detects a first detection area of the first detection target object and a second detection area of the second detection target object by using the first detection unit and the second detection unit, respectively, and the identification unit identifies whether to be the first detection target object, based on a positional relationship between the detected first detection area and the detected second detection area.

8. The target object detection apparatus according to supplementary note 7, wherein the image generation unit generates, from the three-dimensional information, a first two-dimensional image of the inspection target when viewed from a first direction, generates distance information to a reflection point of each of pixels constituting the first two-dimensional image, and further generates, from the three-dimensional information, a second two-dimensional image of the inspection target when viewed from a second direction different from the first direction, the area detection unit detects each of, from the first two-dimensional image, the first detection area of the first detection target object, and, from the second two-dimensional image, the second detection area of the second detection target object, the target object detection apparatus, further including an estimation unit that estimates an area of the first detection target object when viewed from the second direction, based on the first detection area of the first detection target object viewed from the first direction, and the distance information of each of positions of the first detection area, and setting the estimated area as an estimation area, wherein the identification unit identifies whether to be the first detection target object, based on a positional relationship between the estimation area of the first detection target object and the detection area of the second detection target object.

9. The target object detection apparatus according to supplementary note 8, wherein the identification unit identifies as not the first detection target object, when a degree of agreement between the estimation area of the first detection target object and the detection area of the second detection target object is equal to or more than a third threshold.

10. The target object detection apparatus according to supplementary note 8 or 9, wherein the identification unit identifies as the first detection target object, when a degree of agreement between the estimation area of the first detection target object and the detection area of the second detection target object is equal to or less than a fourth threshold.

11. The target object detection apparatus according to any one of supplementary notes 1 to 10, further including an output control unit that outputs, when being identified as the detection target object by the identification unit, a result of the identification, and not outputting, when being identified as not the detection target object, a result of the identification.

12. A target object detection method including:

by a target object detection apparatus, generating, from three-dimensional information acquired by processing a reflection wave of an electromagnetic wave irradiated toward an inspection target, a two-dimensional image of the inspection target viewed from a predetermined direction;

detecting, from the two-dimensional image, each of at least two detection areas of a detection target object recognized by using at least two recognition means; and identifying the detection target object, based on a positional relationship between the detected at least two detection areas.

13. The target object detection method according to supplementary note 12, further including:

by the target object detection apparatus, generating, from the three-dimensional information, a first two-dimensional image of the inspection target when viewed from a first direction, and generating distance information to a reflection point of each of pixels constituting the first two-dimensional image;

further generating, from the three-dimensional information, a second two-dimensional image of the inspection target when viewed from a second direction different from the first direction, and generating distance information to a reflection point of each of pixels constituting the second two-dimensional image;

detecting each of, from the first two-dimensional image, a first detection area in which the detection target object is estimated to be present, and, from the second two-dimensional image, a second detection area in which the detection target object is estimated to be present;

further, estimating, with respect to the detection target object viewed from the first direction, an area of the detection target object when viewed from the second direction, based on a detected detection area and the distance information of each of positions of the detection area, and setting the estimated area as an estimation area; and identifying whether to be the detection target object, based on a positional relationship between the estimated estimation area and the detected detection area when viewed from the second direction.

14. The target object detection method according to supplementary note 13, further including:

by the target object detection apparatus, estimating, with respect to the detection target object viewed from the second direction, an area of the detection target object when viewed from the first direction, based on a detected detection area and the distance information of each of positions of the detection area, and setting the estimated area as an estimation area; and identifying whether to be the detection target object, based on a positional relationship between the estimation area and the detection area when viewed from the second direction, and a positional relationship between the estimated estimation area and the detected detection area when viewed from the first direction.

15. The target object detection method according to supplementary note 13 or 14, further including,
by the target object detection apparatus,
identifying as the detection target object, when a degree of agreement between the estimation area and the detection area is equal to or more than a first threshold.

16. The target object detection method according to any one of supplementary notes 13 to 15, further including,
by the target object detection apparatus,
identifying as not the detection target object, when a degree of agreement between the estimation area and the detection area is equal to or less than a second threshold.

17. The target object detection method according to any one of supplementary notes 13 to 16, further including:
by the target object detection apparatus,
storing in advance the distance information of the detection target object in a storage apparatus; and
estimating, based on the distance information of the detection target object stored in advance in the storage apparatus, an estimation area in which the detection target object is estimated to be present at a time when the detection target object is viewed from the second direction.

18. The target object detection method according to supplementary note 12, wherein
the recognition means includes a first detection unit that detects a first detection target object, and a second detection unit that recognizes a second detection target object different from the first detection target object,
the target object detection method further including:
by the target object detection apparatus,
detecting a first detection area of the first detection target object and a second detection area of the second detection target object by using the first detection unit and the second detection unit, respectively; and
identifying whether to be the first detection target object, based on a positional relationship between the detected first detection area and the detected second detection area.

19. The target object detection method according to supplementary note 18, further including:
by the target object detection apparatus,
generating, from the three-dimensional information, a first two-dimensional image of the inspection target when viewed from a first direction, generating distance information to a reflection point of each of pixels constituting the first two-dimensional image, and further generating, from the three-dimensional information, a second two-dimensional image of the inspection target when viewed from a second direction different from the first direction;
detecting each of, from the first two-dimensional image, the first detection area of the first detection target object, and, from the second two-dimensional image, the second detection area of the second detection target object;
estimating an area of the first detection target object when viewed from the second direction, based on the first detection area of the first detection target object viewed from the first direction, and the distance information of each of positions of the first detection area, and setting the estimated area as an estimation area; and
identifying whether to be the first detection target object, based on a positional relationship between the estimation area of the first detection target object and the detection area of the second detection target object.

20. The target object detection method according to supplementary note 19, further including,
by the target object detection apparatus,
identifying as not the first detection target object, when a degree of agreement between the estimation area of the first detection target object and the detection area of the second detection target object is equal to or more than a third threshold.

21. The target object detection method according to supplementary note 19 or 20, further including,
by the target object detection apparatus,
identifying as the first detection target object, when a degree of agreement between the estimation area of the first detection target object and the detection area of the second detection target object is equal to or less than a fourth threshold.

22. The target object detection method according to any one of supplementary notes 12 to 21, further including,
by the target object detection apparatus,
outputting, when being identified as the detection target object, a result of the identification, and not outputting, when being identified as not the detection target object, a result of the identification.

23. A program for causing a computer to execute:
a procedure for generating, from three-dimensional information acquired by processing a reflection wave of an electromagnetic wave irradiated toward an inspection target, a two-dimensional image of the inspection target viewed from a predetermined direction;
a procedure for detecting, from the two-dimensional image, each of at least two detection areas of a detection target object recognized by using at least two recognition means; and
a procedure for identifying the detection target object, based on a positional relationship between the detected at least two detection areas.

24. The program according to supplementary note 23, for further causing a computer to execute:
a procedure for generating, from the three-dimensional information, a first two-dimensional image of the inspection target when viewed from a first direction, and generating distance information to a reflection point of each of pixels constituting the first two-dimensional image;
a procedure for generating, from the three-dimensional information, a second two-dimensional image of the inspection target when viewed from a second direction different from the first direction, and generating distance information to a reflection point of each of pixels constituting the second two-dimensional image;
a procedure for detecting each of, from the first two-dimensional image, a first detection area in which the detection target object is estimated to be present, and, from the second two-dimensional image, a second detection area in which the detection target object is estimated to be present;

a procedure for estimating, with respect to the detection target object viewed from the first direction, an area of the detection target object when viewed from the second direction, based on a detection area detected by the procedure for detecting, and the distance information of each of positions of the detection area, and setting the estimated area as an estimation area; and a procedure for identifying whether to be the detection target object, based on a positional relationship between the estimated estimation area and the detected detection area when viewed from the second direction.

25. The program according to supplementary note 24, for further causing a computer to execute:
a procedure for estimating, with respect to the detection target object viewed from the second direction, an area of the detection target object when viewed from the first direction, based on a detection area detected by the procedure for detecting and the distance information of each of positions of the detection area, and setting the estimated area as an estimation area; and a procedure for identifying whether to be the detection target object, based on a positional relationship between the estimation area and the detection area when viewed from the second direction, and a positional relationship between the estimated estimation area and the detected detection area when viewed from the first direction.

26. The program according to supplementary note 24 or 25, for further causing a computer to execute
a procedure for identifying as the detection target object, when a degree of agreement between the estimation area and the detection area is equal to or more than a first threshold.

27. The program according to any one of supplementary notes 24 to 26, for further causing a computer to execute
a procedure for identifying as not the detection target object, when a degree of agreement between the estimation area and the detection area is equal to or less than a second threshold.

28. The program according to any one of supplementary notes 24 to 27, for further causing a computer to execute:
a procedure for storing in advance the distance information of the detection target object in a storage apparatus; and
a procedure for estimating, based on the distance information of the detection target object stored in advance in the storage apparatus, an estimation area in which the detection target object is estimated to be present at a time when the detection target object is viewed from the second direction.

29. The program according to supplementary note 23, wherein
the recognition means includes a first detection unit that detects a first detection target object, and a second detection unit that recognizes a second detection target object different from the first detection target object,
the program for further causing a computer to execute:
a procedure for detecting a first detection area of the first detection target object and a second detection area of the second detection target object by using the first detection unit and the second detection unit, respectively; and
a procedure for identifying whether to be the first detection target object, based on a positional relationship between the detected first detection area and the detected second detection area.

30. The program according to supplementary note 29, for further causing a computer to execute:
a procedure for generating, from the three-dimensional information, a first two-dimensional image of the inspection target when viewed from a first direction, generating distance information to a reflection point of each of pixels constituting the first two-dimensional image, and generating, from the three-dimensional information, a second two-dimensional image of the inspection target when viewed from a second direction different from the first direction;
a procedure for detecting each of, from the first two-dimensional image, the first detection area of the first detection target object, and, from the second two-dimensional image, the second detection area of the second detection target object;
a procedure for estimating an area of the first detection target object when viewed from the second direction, based on the first detection area of the first detection target object viewed from the first direction, and the distance information of each of positions of the first detection area, and setting the estimated area as an estimation area; and
a procedure for identifying whether to be the first detection target object, based on a positional relationship between the estimation area of the first detection target object and the detection area of the second detection target object.

31. The program according to supplementary note 30, for further causing a computer to execute
a procedure for identifying as not the first detection target object, when a degree of agreement between the estimation area of the first detection target object and the detection area of the second detection target object is equal to or more than a third threshold.

32. The program according to supplementary note 30 or 31, for further causing a computer to execute
a procedure for identifying as the first detection target object, when a degree of agreement between the estimation area of the first detection target object and the detection area of the second detection target object is equal to or less than a fourth threshold.

33. The program according to any one of supplementary notes 23 to 32, for further causing the computer to execute
a procedure for outputting, when being identified as the detection target object, a result of the identification, and not outputting, when being identified as not the detection target object, a result of the identification.

What is claimed is:
1. A target object detection apparatus comprising:
at least one memory storing instructions; and
at least one processor configured to execute the instructions to:
generate, from three-dimensional information acquired by processing a reflection wave of an electromagnetic wave irradiated toward an inspection target, a two-dimensional image of the inspection target viewed from a predetermined direction;

detect, from the two-dimensional image, each of at least two detection areas of a detection target object recognized by using at least two recognition means;

identify the detection target object, based on a positional relationship between the detected at least two detection areas;

generate, from the three-dimensional information, a first two-dimensional image of the inspection target when viewed from a first direction, and generate distance information to a reflection point of each of pixels constituting the first two-dimensional image;

generate, from the three-dimensional information, a second two-dimensional image of the inspection target when viewed from a second direction different from the first direction, and generate distance information to a reflection point of each of pixels constituting the second two-dimensional image;

detect each of, from the first two-dimensional image, a first detection area in which the detection target object is estimated to be present, and, from the second two-dimensional image, a second detection area in which the detection target object is estimated to be present;

estimate, with respect to the detection target object viewed from the first direction, an area of the detection target object when viewed from the second direction, based on a detection area detected and the distance information of each of positions of the detection area, and set the estimated area as an estimation area; and identify whether the detection target object is present, based on a positional relationship between the estimation area estimated and the detection area detected when viewed from the second direction.

2. The target object detection apparatus according to claim 1, wherein the at least one processor is further configured to execute the instructions to:

estimate, with respect to the detection target object viewed from the second direction, an area of the detection target object when viewed from the first direction, based on a detection area detected and the distance information of each of positions of the detection area, and set the estimated area as an estimation area; and identify whether the detection target object is present, based on a positional relationship between the estimation area and the detection area when viewed from the second direction, and a positional relationship between the estimation area estimated and the detection area detected when viewed from the first direction.

3. The target object detection apparatus according to claim 1, wherein the at least one processor is further configured to execute the instructions to identify the detection target object is present, when a degree of agreement between the estimation area and the detection area is equal to or more than a first threshold.

4. The target object detection apparatus according to claim 1, wherein the at least one processor is further configured to execute the instructions to not identify the detection target object is present, when a degree of agreement between the estimation area and the detection area is equal to or less than a second threshold.

5. The target object detection apparatus according to claim 1, wherein the at least one processor is further configured to execute the instructions to:

cause a storage to store in advance the distance information of the detection target object; and estimate, based on the distance information of the detection target object stored in advance by the storage, an estimation area in which the detection target object is estimated to be present at a time when the detection target object is viewed from the second direction.

6. The target object detection apparatus according to claim 1, wherein the recognition means includes a first detector that detects a first detection target object, and a second detector that recognizes a second detection target object different from the first detection target object, and the at least one processor is further configured to execute the instructions to:

detect a first detection area of the first detection target object and a second detection area of the second detection target object by using the first detector and the second detector, respectively; and identify whether the first detection target object is present, based on a positional relationship between the detected first detection area and the detected second detection area.

7. The target object detection apparatus according to claim 6, wherein the at least one processor is further configured to execute the instructions to:

generate, from the three-dimensional information, a first two-dimensional image of the inspection target when viewed from a first direction, generate distance information to a reflection point of each of pixels constituting the first two-dimensional image, and further generate, from the three-dimensional information, a second two-dimensional image of the inspection target when viewed from a second direction different from the first direction;

detect each of, from the first two-dimensional image, the first detection area of the first detection target object, and, from the second two-dimensional image, the second detection area of the second detection target object;

estimate an area of the first detection target object when viewed from the second direction, based on the first detection area of the first detection target object viewed from the first direction, and the distance information of each of positions of the first detection area, and set the estimated area as an estimation area; and identify whether the first detection target object is present, based on a positional relationship between the estimation area of the first detection target object and the detection area of the second detection target object.

8. The target object detection apparatus according to claim 7, wherein the at least one processor is further configured to execute the instructions to identify the first detection target object is not present, when a degree of agreement between the estimation area of the first detection target object and the detection area of the second detection target object is equal to or more than a third threshold.

9. The target object detection apparatus according to claim 7, wherein the at least one processor is further configured to execute the instructions to identify the first detection target object is present, when a degree of agreement between the estimation area of the first detection target object and the detection area of the second detection target object is equal to or less than a fourth threshold.

10. The target object detection apparatus according to claim 1, wherein the at least one processor is further configured to execute the instructions to:
output, when having identified the detection target object is present, a result of the identification, and do not output, when having not identified the detection target object is present, a result of the identification.

11. A target object detection method performed by a target detection apparatus and comprising:
generating, from three-dimensional information acquired by processing a reflection wave of an electromagnetic wave irradiated toward an inspection target, a two-dimensional image of the inspection target viewed from a predetermined direction;
detecting, from the two-dimensional image, each of at least two detection areas of a detection target object recognized by using at least two recognition means;
identifying the detection target object, based on a positional relationship between the detected at least two detection areas;
generating, from the three-dimensional information, a first two-dimensional image of the inspection target when viewed from a first direction, and generate distance information to a reflection point of each of pixels constituting the first two-dimensional image;
generating, from the three-dimensional information, a second two-dimensional image of the inspection target when viewed from a second direction different from the first direction, and generate distance information to a reflection point of each of pixels constituting the second two-dimensional image;
detecting each of, from the first two-dimensional image, a first detection area in which the detection target object is estimated to be present, and, from the second two-dimensional image, a second detection area in which the detection target object is estimated to be present;
estimating, with respect to the detection target object viewed from the first direction, an area of the detection target object when viewed from the second direction, based on a detection area detected and the distance information of each of positions of the detection area, and set the estimated area as an estimation area; and
identifying whether the detection target object is present, based on a positional relationship between the estimation area estimated and the detection area detected when viewed from the second direction.

12. The target object detection method according to claim 11, further comprising:
estimating, with respect to the detection target object viewed from the second direction, an area of the detection target object when viewed from the first direction, based on a detected detection area and the distance information of each of positions of the detection area, and setting the estimated area as an estimation area; and
identifying whether the detection target object is present, based on a positional relationship between the estimation area and the detection area when viewed from the second direction, and a positional relationship between the estimated estimation area and the detected detection area when viewed from the first direction.

13. The target object detection method according to claim 11, further comprising
identifying the detection target object is present, when a degree of agreement between the estimation area and the detection area is equal to or more than a first threshold.

14. The target object detection method according to claim 11, further comprising
not identifying the detection target object is present, when a degree of agreement between the estimation area and the detection area is equal to or less than a second threshold.

15. The target object detection method according to claim 11, further comprising:
storing in advance the distance information of the detection target object in a storage apparatus; and
estimating, based on the distance information of the detection target object stored in advance in the storage apparatus, an estimation area in which the detection target object is estimated to be present at a time when the detection target object is viewed from the second direction.

16. The target object detection method according to claim 11, wherein
the recognition means includes a first detector that detects a first detection target object, and a second detector that recognizes a second detection target object different from the first detection target object, and
the target object detection method further comprises:
detecting a first detection area of the first detection target object and a second detection area of the second detection target object by using the first detector and the second detector, respectively; and
identifying whether the first detection target object is present, based on a positional relationship between the detected first detection area and the detected second detection area.

17. The target object detection method according to claim 16, further comprising:
generating, from the three-dimensional information, a first two-dimensional image of the inspection target when viewed from a first direction, generating distance information to a reflection point of each of pixels constituting the first two-dimensional image, and further generating, from the three-dimensional information, a second two-dimensional image of the inspection target when viewed from a second direction different from the first direction;
detecting each of, from the first two-dimensional image, the first detection area of the first detection target object, and, from the second two-dimensional image, the second detection area of the second detection target object;
estimating an area of the first detection target object when viewed from the second direction, based on the first detection area of the first detection target object viewed from the first direction, and the distance information of each of positions of the first detection area, and setting the estimated area as an estimation area; and
identifying whether the first detection target object is present, based on a positional relationship between the estimation area of the first detection target object and the detection area of the second detection target object.

18. The target object detection method according to claim 17, further comprising
identifying the first detection target object is not present, when a degree of agreement between the estimation area of the first detection target object and the detection area of the second detection target object is equal to or more than a third threshold.

19. The target object detection method according to claim 17, further comprising
identifying the first detection target object is present, when a degree of agreement between the estimation area of the first detection target object and the detection area of the second detection target object is equal to or less than a fourth threshold.

20. The target object detection method according to claim 11, further comprising
outputting, when having identified the detection target object is present, a result of the identification, and not outputting, when having not identified the detection target object is present, a result of the identification.

21. A non-transitory computer-readable storage medium storing a program executable by a computer to perform processing comprising:
generating, from three-dimensional information acquired by processing a reflection wave of an electromagnetic wave irradiated toward an inspection target, a two-dimensional image of the inspection target viewed from a predetermined direction;
detecting, from the two-dimensional image, each of at least two detection areas of a detection target object recognized by using at least two recognition means;
identifying the detection target object, based on a positional relationship between the detected at least two detection areas;
generating, from the three-dimensional information, a first two-dimensional image of the inspection target when viewed from a first direction, and generate distance information to a reflection point of each of pixels constituting the first two-dimensional image;
generating, from the three-dimensional information, a second two-dimensional image of the inspection target when viewed from a second direction different from the first direction, and generate distance information to a reflection point of each of pixels constituting the second two-dimensional image;
detecting each of, from the first two-dimensional image, a first detection area in which the detection target object is estimated to be present, and, from the second two-dimensional image, a second detection area in which the detection target object is estimated to be present;
estimating, with respect to the detection target object viewed from the first direction, an area of the detection target object when viewed from the second direction, based on a detection area detected and the distance information of each of positions of the detection area, and set the estimated area as an estimation area; and
identifying whether the detection target object is present, based on a positional relationship between the estimation area estimated and the detection area detected when viewed from the second direction.

22. The non-transitory computer-readable storage medium according to claim 21, wherein the processing further comprises:
estimating, with respect to the detection target object viewed from the second direction, an area of the detection target object when viewed from the first direction, based on a detected detection area and the distance information of each of positions of the detection area, and setting the estimated area as an estimation area; and
identifying whether the detection target object is present, based on a positional relationship between the estimation area and the detection area when viewed from the second direction, and a positional relationship between the estimated estimation area and the detected detection area when viewed from the first direction.

23. The non-transitory computer-readable storage medium according to claim 21, wherein the processing further comprises:
identifying the detection target object is present, when a degree of agreement between the estimation area and the detection area is equal to or more than a first threshold.

24. The non-transitory computer-readable storage medium according to claim 21, wherein the processing further comprises:
not identifying the detection target object is present, when a degree of agreement between the estimation area and the detection area is equal to or less than a second threshold.

25. The non-transitory computer-readable storage medium according to claim 21, wherein the processing further comprises: storing in advance the distance information of the detection target object in a storage apparatus;
estimating, based on the distance information of the detection target object stored in advance in the storage apparatus, an estimation area in which the detection target object is estimated to be present at a time when the detection target object is viewed from the second direction.

26. The non-transitory computer-readable storage medium according to claim 21, wherein
the recognition means includes a first detector that detects a first detection target object, and a second detector that recognizes a second detection target object different from the first detection target object, and
the processing further comprises:
for detecting a first detection area of the first detection target object and a second detection area of the second detection target object by using the first detector and the second detector, respectively; and
identifying whether the first detection target object is present, based on a positional relationship between the detected first detection area and the detected second detection area.

27. The non-transitory computer-readable storage medium according to claim 26, wherein the processing further comprises:
generating, from the three-dimensional information, a first two-dimensional image of the inspection target when viewed from a first direction, generating distance information to a reflection point of each of pixels constituting the first two-dimensional image, and generating, from the three-dimensional information, a second two-dimensional image of the inspection target when viewed from a second direction different from the first direction;
detecting each of, from the first two-dimensional image, the first detection area of the first detection target object, and, from the second two-dimensional image, the second detection area of the second detection target object;
estimating an area of the first detection target object when viewed from the second direction, based on the first detection area of the first detection target object viewed from the first direction, and the distance information of each of positions of the first detection area, and setting the estimated area as an estimation area; and identifying whether the first detection target object is present, based on a positional relationship between the estimation area of the first detection target object and the detection area of the second detection target object.

28. The non-transitory computer-readable storage medium according to claim 27, wherein the processing further comprises:

identifying the first detection target object is not present, when a degree of agreement between the estimation area of the first detection target object and the detection area of the second detection target object is equal to or more than a third threshold.

29. The non-transitory computer-readable storage medium according to claim 27, wherein the processing further comprises:

identifying the first detection target object is present, when a degree of agreement between the estimation area of the first detection target object and the detection area of the second detection target object is equal to or less than a fourth threshold.

30. The non-transitory computer-readable storage medium according to claim 21, wherein the processing further comprises:

outputting, when having identified the detection target object is present, a result of the identification, and not outputting, when having not identified as not the detection target object is present, a result of the identification.

* * * * *